(12) United States Patent
Murakami et al.

(10) Patent No.: US 8,976,204 B2
(45) Date of Patent: Mar. 10, 2015

(54) DISPLAY DEVICE

(75) Inventors: Hirofumi Murakami, Osaka (JP); Kohji Fujiwara, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 395 days.

(21) Appl. No.: 13/581,388

(22) PCT Filed: Jan. 7, 2011

(86) PCT No.: PCT/JP2011/050188
§ 371 (c)(1),
(2), (4) Date: Aug. 27, 2012

(87) PCT Pub. No.: WO2011/129124
PCT Pub. Date: Oct. 20, 2011

(65) Prior Publication Data
US 2012/0320107 A1    Dec. 20, 2012

(30) Foreign Application Priority Data
Apr. 12, 2010  (JP) ................... 2010-091542

(51) Int. Cl.
*G09G 3/36* (2006.01)
*G09G 5/10* (2006.01)
*G09G 3/34* (2006.01)
*G02F 1/1335* (2006.01)

(52) U.S. Cl.
CPC ........ *G09G 3/3426* (2013.01); *G02F 1/133603* (2013.01); *G09G 3/3611* (2013.01); *G09G 2310/0237* (2013.01); *G09G 2310/08* (2013.01); *G09G 2320/0252* (2013.01); *G09G 2320/0261* (2013.01); *G09G 2320/0271* (2013.01); *G09G 2320/041* (2013.01); *G09G 2320/0646* (2013.01); *G09G 2320/0653* (2013.01);

(Continued)

(58) Field of Classification Search
CPC .................................. G09G 3/36; G09G 5/10
See application file for complete search history.

(56) References Cited

U.S. PATENT DOCUMENTS

| 2004/0017343 A1* | 1/2004 | Adachi et al. ................... 345/87 |
| 2005/0052389 A1* | 3/2005 | Sawabe ........................... 345/89 |

(Continued)

FOREIGN PATENT DOCUMENTS

| JP | 2001-343956 | 12/2001 |
| JP | 2004-163829 | 6/2004 |

(Continued)

OTHER PUBLICATIONS

Search Report mailed Feb. 8, 2011, directed to International Application No. PCT/JP2011/050188; 2 pages.

*Primary Examiner* — Andrew Sasinowski
(74) *Attorney, Agent, or Firm* — Morrison & Foerster LLP

(57) ABSTRACT

Disclosed is a liquid crystal display device (1) provided with a backlight part (3) that has a light-emitting diode (light source), and a liquid crystal panel (display part) (2) that includes a plurality of pixels (P) and displays information using illumination light from the backlight part (3). A video generating device (control part) (9) decides, in a frame in which a gray-scale transition occurs, at least a length of either an OFF period of the light-emitting diode in a first half of the frame or an ON period of the light-emitting diode in a latter half of the frame, based on the time information from the time information generating part (26), and outputs an instruction signal to a light source driving part (14) in accordance with the decided OFF or ON period for driving the light-emitting diode.

12 Claims, 15 Drawing Sheets

(52) U.S. Cl.
CPC ...... *G09G2320/103* (2013.01); *G09G 2340/16* (2013.01); *G09G 2360/16* (2013.01); *G02F 2203/30* (2013.01)
USPC .......................................... 345/690; 345/102

(56) References Cited

U.S. PATENT DOCUMENTS

2008/0074372 A1* 3/2008 Baba et al. ................. 345/89
2010/0238103 A1* 9/2010 Ruckmongathan ............. 345/89
2010/0328535 A1 12/2010 Okui et al.
2011/0267383 A1 11/2011 Murakami et al.

FOREIGN PATENT DOCUMENTS

| | | |
|---|---|---|
| JP | 2005-107491 | 4/2005 |
| JP | 2008-76755 | 4/2008 |
| WO | WO-2009/096329 | 8/2009 |
| WO | WO-2010/134235 | 11/2010 |

* cited by examiner

DISPLAY DEVICE

REFERENCE TO RELATED APPLICATIONS

This application is a national stage application under 35 USC 371 of International Application No. PCT/JP2011/050188, filed Jan. 7, 2011, which claims priority from Japanese Patent Application No. 2010-091542 filed Apr. 12, 2010, the entire contents of which are incorporated herein by reference.

FIELD OF THE INVENTION

The present invention relates to a display device, in particular, to a non-emission type display device such as a liquid crystal display device.

BACKGROUND OF THE INVENTION

Recently, for example, a liquid crystal display device has been used widely in a liquid crystal television, a monitor, a mobile telephone and the like, as a flat panel display having advantages such as thinness and light-weight in comparison with conventional Braun tubes. Such a liquid crystal display device includes an illumination device (backlight) that emits light and a liquid crystal panel that has a plurality of pixels and displays a desired image by playing a role as a shutter with respect to light from a light source provided in the illumination device.

Further, a liquid crystal display device as described above is a so-called hold-type display device, which holds luminance of each pixel for one frame period (one vertical period) in which one display screen image is rewritten. Because of this, when such a liquid crystal display device displays a moving image, a problem of moving image blurring (pseudo-contour) is caused in some cases, i.e., an outline of a displayed moving object is visually recognized blurringly.

Specifically, in the liquid crystal display device, by applying, on a pixel basis, voltages to a liquid crystal layer contained in the liquid crystal panel in accordance with the gray scale of a display image, an orientation state of liquid crystal molecules and, by extension, a transmittance of each pixel (transmittance of a liquid crystal) are changed for displaying the display image. However, as compared with a so-called impulse-type display device such as CRT, the liquid crystal display device has low responsivity with respect to video data. In other words, the liquid crystal display device generally uses a liquid crystal with a slow response speed (a changing speed of the transmittance of the liquid crystal). Because of this, in the liquid crystal display device, when a gray-scale transition (gray-scale change) occurs between two consecutive frames (display image) at the time of displaying a moving image, an image having a middle gray scale is visually recognized, which sometimes is recognized as the above-described moving image blurring.

Therefore, with respect to a conventional liquid crystal display device, for example, as described in Patent Document 1 below, there has been a proposal of performing an overshoot drive capable of improving the response speed of the liquid crystal. In other words, in this conventional liquid crystal display device, when the gray-scale transition occurs between two consecutive frames, a predetermined gray-scale transition emphasis process (overshoot drive) is performed with respect to video data of the frame in which the gray-scale transition occurs.

Specifically, in this conventional liquid crystal display device, in the two consecutive frames, when the gray-scale transition occurs from a gray scale A to a gray scale B that is higher than the gray scale A for example, a voltage that is higher than a voltage for achieving the gray scale B is applied to the pixel for a predetermined period. Then, a voltage in accordance with the target gray scale B is applied. Consequently, in this conventional liquid crystal display device, it has been considered that the orientation change of liquid crystal molecules is promoted and the response speed of the liquid crystal is improved, whereby the moving image blurring can be suppressed.

Patent Document 1: JP 2001-343956 A

SUMMARY OF THE INVENTION

However, in the conventional liquid crystal display device as described above, the moving image blurring sometimes cannot be suppressed when a degree of the gray-scale transition is large.

Specifically, in the case where the degree of the gray-scale transition is large in this conventional liquid crystal display device, an image having a middle gray scale sometimes cannot be prevented from being visually recognized during the transition from a gray scale of a previous frame to a gray scale of a current frame, even if the gray-scale transition emphasis process is performed. Consequently, in this conventional liquid crystal display device, the moving image blurring sometimes cannot be suppressed when the degree of the gray-scale transition is large.

In view of the above-described problem, it is an object of the present invention to provide a display device capable of suppressing moving image blurring even if the degree of the gray-scale transition is large.

To achieve the above object, a display device according to the present invention is provided with a backlight part that has a light source, and a display part that includes a plurality of pixels and displays information using illumination light from the backlight part. The display device includes: a light source driving part that drives the light source; a display driving part that drives the display part on a pixel basis; a time information generating part that calculates, when a gray-scale transition occurs between two consecutive frames, an average time taken to respond to the gray-scale transition in the plurality of pixels, and generates it as time information; and a control part that controls drive of the light source driving part and drive of the display driving part using inputted video data and the time information from the time information generating part. The control part decides, in the frame in which the gray-scale transition occurs, at least a length of either an OFF period of the light source in a first half of the frame or an ON period of the light source in a latter half of the frame, based on the time information from the time information generating part, and outputs an instruction signal to the light source driving part in accordance with the decided OFF or ON period for driving the light source.

In the display device configured as above, when the gray-scale transition occurs between two consecutive frames, the time information generating part calculates an average time taken to respond to the gray-scale transition in the plurality of pixels, and generates it as time information. Further, the control part decides, in the frame in which the gray-scale transition occurs, at least a length of either an OFF period of the light source in a first half of the frame or an ON period of the light source in a latter half of the frame, based on the time information from the time information generating part. Further, the control part outputs an instruction signal to the light source driving part in accordance with the decided OFF or ON period for driving the light source. Thereby, it becomes possible to drive the light source properly while determining the degree of the gray-scale transition. Consequently, unlike the above-described conventional example, it is possible to configure a display device capable of suppressing moving image blurring even if the degree of the gray-scale transition is large.

Further, in the above-described display device, it is preferable to further include a gray-scale converting part that performs, when a gray-scale transition occurs between two consecutive frames, a predetermined gray-scale transition emphasis process with respect to video data of the frame in which the gray-scale transition occurs, and outputs video data after the gray-scale transition emphasis process to the time information generating part. The time information generating part calculates an average time taken to respond to the gray-scale transition in the plurality of pixels using the video data from the gray-scale converting part, and generates it as time information.

In this case, since the time information generating part generates the above-described time information using the video data subjected to the gray-scale transition emphasis process at the gray-scale converting part, the control part can drive the light source more properly while determining the degree of the gray-scale transition. Therefore, even if the degree of the gray-scale transition is large, moving image blurring can be suppressed reliably. Further, as compared with the case of not performing the gray-scale transition emphasis process, the control part can lengthen the ON period of the light source, whereby a high-luminance display can be realized easily.

Further, in the above-described display device, the control part may decide the length of the OFF period to be longer as the average time included in the time information from the time information generating part is longer.

In this case, since the gray-scale transition can be completed within the OFF period of the light source in the first half of the frame in which the gray-scale transition occurs, moving image blurring can be suppressed reliably even when the degree of the gray-scale transition is large.

Further, in the above-described display device, when the control part determines that a gray-scale transition does not occur between two consecutive frames, it may decide the length of the OFF period to be a fixed value in the frame in which the gray-scale transition does not occur.

In this case, processing operations at the control part can be simplified, and a processing load of the control part can be reduced accordingly.

Further, in the above-described display device, the control part may be provided with a lighting auxiliary part that corrects the instruction signal for increasing luminance of the light source based on the decided ON or OFF period.

In this case, in the respective pixels of the display part, a lack of luminance can be avoided.

Further, in the above-described display device, the control part may be provided with a timing adjusting part in which frame delay data is set that indicates a frame delay period caused by signal processing performed until the time when inputted video data is supplied to the display driving part, and that adjusts, in accordance with the set frame delay data, output timing of the instruction signal with respect to the light source driving part for delaying drive of the light source on a frame basis.

In this case, even when the frame delay period is caused, the display part and the light source can be driven properly, and moving image blurring can be suppressed reliably.

Further, in the above-described display device, the control part may be provided with a phase timing adjusting part in which phase shift data is set that indicates a phase shift less than one frame period caused by signal processing performed until the time when inputted video data is supplied to the display driving part, and that adjusts, in accordance with the set phase shift data, output timing of the instruction signal with respect to the light source driving part for delaying the drive of the light source.

In this case, even when a phase shift is caused, the display part and the light source can be driven properly, and moving image blurring can be suppressed reliably.

Further, in the above-described display device, it is preferable that a plurality of display areas are set in the display part, a plurality of illumination areas are set in the backlight part for causing light of the light source to respectively enter the plurality of display areas provided in the display part, and the light source driving part drives the light source on the illumination area basis.

In this case, since an adverse effect of the gray-scale transition on the display can be reduced properly per display area, the display quality is improved. Further, since the light source is driven on the illumination area basis, it is possible to configure a display device with less power consumption easily.

Further, in the above-described display device, the control part may be provided with a lighting auxiliary part that corrects the instruction signal for increasing luminance of the light source on the illumination area basis based on the decided ON or OFF period.

In this case, in the respective pixels of the display area, the lack of luminance can be avoided reliably.

Further, in the above-described display device, the display part may be a liquid crystal panel.

In this case, even if the degree of the gray-scale transition is large, it is possible to configure a liquid crystal display device capable of suppressing moving image blurring.

Further, in the above-described display device, the light source may be a light-emitting diode.

In this case, it is possible to easily configure a display device with less power consumption and excellent environmental friendliness.

Further, in the above-described display device, the light source may be a plurality of types of light-emitting diodes whose emission light colors are different from each other and that can be mixed into white light.

In this case, it is possible to improve the color purities of the emission light colors of the plurality of types of the respective light-emitting diodes, and to configure a display device with excellent display quality easily.

According to the present invention, it is possible to provide a display device capable of suppressing moving image blurring even if a degree of a gray-scale transition is large.

DETAILED DESCRIPTION OF THE INVENTION

Figure 1:
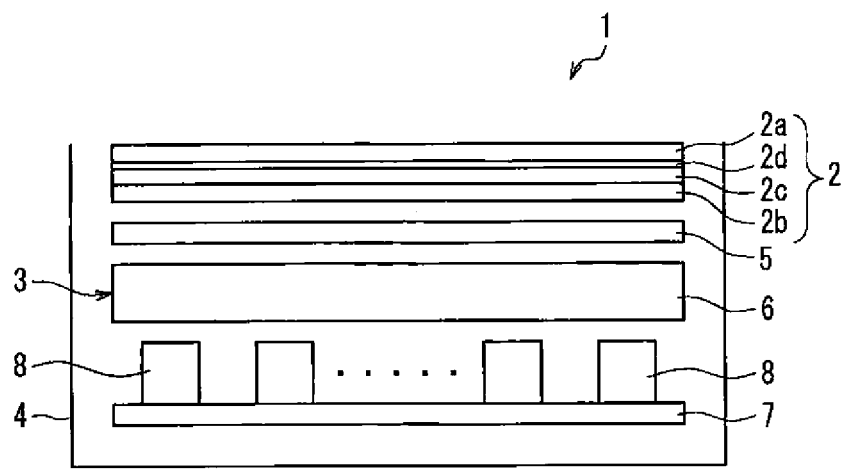
FIG. 1 is a view illustrating a schematic configuration of a liquid crystal display device according to Embodiment 1 of the present invention.

Hereinafter, preferred embodiments of a display device of the present invention will be described with reference to the drawings. In the following description, the present invention is applied to a transmission-type liquid crystal display device. Further, the dimensions of constituent members in the drawings do not faithfully reflect the actual dimensions of constituent members, dimension ratio of the respective constituent members, etc.

[Embodiment 1]

FIG. 1 is a view illustrating a schematic configuration of a liquid crystal display device according to Embodiment 1 of the present invention. In the drawing, a liquid crystal display device 1 of the present embodiment is provided with a liquid crystal panel (LCD) 2 as a display part that is located with an upper side of FIG. 1 defined as a viewing side (display surface side) and a backlight device 3 as a backlight part that is disposed on a non-display surface side of the liquid crystal panel 2 (the lower side in the drawing) and that generates illumination light for illuminating the liquid crystal panel 2. Further, in the present embodiment, the liquid crystal panel 2 and the backlight device 3 are contained integrally as a transmission-type liquid crystal display device 1 inside a housing 4. Further, the liquid crystal display device 1 of the present embodiment is provided with a later-described video generating device (control part) that controls drive of the liquid crystal panel 2 and drive of the backlight device 3 using (input) video data (video signal) inputted from the outside (detailed later).

The liquid crystal panel 2 includes a pair of transparent substrates 2a, 2b, a liquid crystal layer 2c and a color filter (CF) 2d both of which are interposed between the transparent substrates 2a, 2b. The liquid crystal panel 2 is provided further with a plurality of pixels, and thus is configured to be capable of displaying information such as characters and images of a full-color image using illumination light from the backlight device 3. Further, in the liquid crystal panel 2, as detailed later, a plurality of display areas are set on the display surface.

The backlight device 3 includes an optical sheet group 5, a diffusion plate 6 and LED substrates 7 on which LED units 8, each including light-emitting diodes of three colors of red (R), green (G) and blue (B), are mounted. The optical sheet group 5 includes, for example, a polarizing sheet and a prism (focusing) sheet. These optical sheets serve to increase the luminance of the above-described illumination light from the backlight device 3 suitably, thereby improving the display performance of the liquid crystal panel 2.

In the backlight device 3, a plurality of LED substrates 7 are arranged in matrix, and a plurality of LED units 8 are placed on each of the LED substrates 7. Further, the backlight device 3 has a plurality of illumination areas for causing lights of the light-emitting diodes (light sources) to respectively enter the plurality of display areas provided in the liquid crystal panel 2, whereby an area active backlight drive for switching on the light-emitting diodes on the illumination area basis is performed.

Here, the LED substrate 7 and the LED unit 8 of the present embodiment will be described specifically with reference to FIGS. 2-4.

Figure 2:
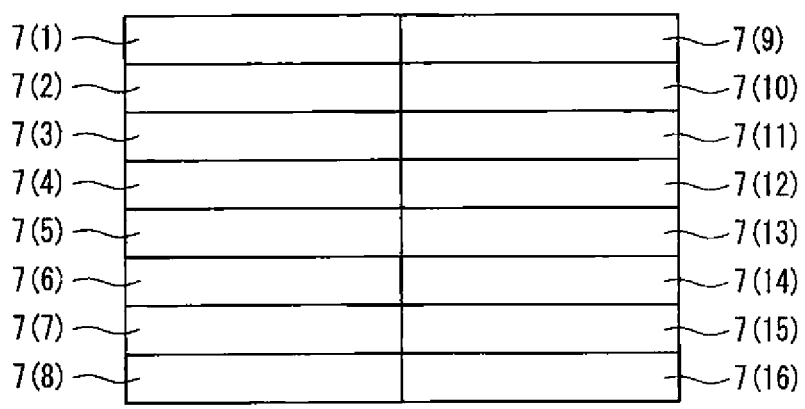
FIG. 2 is a plan view showing a configuration of LED substrates of a backlight device shown in FIG. 1.

FIG. 2 is a plan view showing a configuration of the LED substrates of the backlight device shown in FIG. 1. FIG. 3 is a plan view showing an exemplary arrangement of the LED units on the LED substrate shown in FIG. 2. FIG. 4 is a plan view showing an exemplary configuration of the LED units shown in FIG. 3.

As illustrated in FIG. 2, 2×8 (16 in total) LED substrates 7(1), 7(2) . . . 7(15), 7(16) (hereinafter, referred to as "7" collectively) are arranged in the backlight device 3. Each of the LED substrates 7 is partitioned into 2×16 (32 in total) regions as shown in FIG. 3, and the LED units 8 are mounted on each of the regions. The thirty-two regions respectively constitute the illumination areas Ha1, Ha2, . . . Ha31, Ha32 (hereinafter, referred to as "Ha" collectively) that are set in the backlight device 3.

Figure 3:
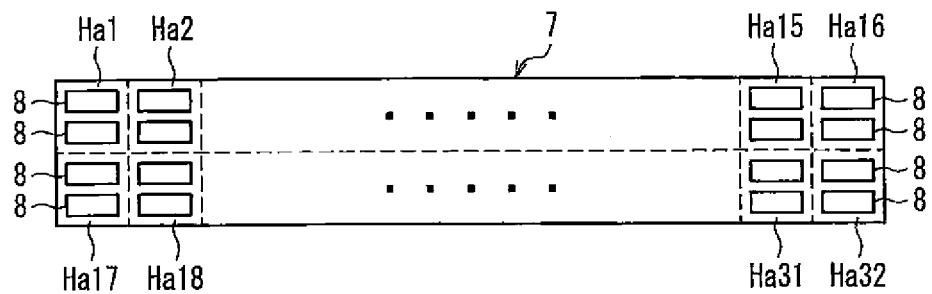
FIG. 3 is a plan view showing an exemplary arrangement of LED units on the LED substrate shown in FIG. 2.

In FIG. 3, the respective illumination areas Ha are divided from each other with longitudinal and transverse lines for clarity, but the respective illumination areas Ha are not divided actually with any border lines or partitions. However, it is also possible, for example, to provide partitions on the LED substrate 7 so as to divide the respective illumination areas Ha from each other.

Figure 4:
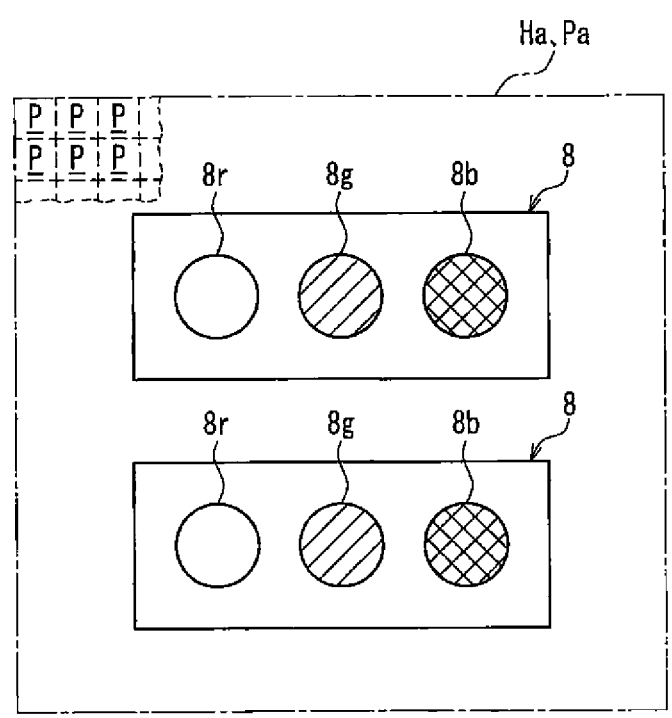
FIG. 4 is a plan view showing an exemplary configuration of the LED units shown in FIG. 3.

As illustrated in FIG. 4, each of the illumination areas Ha is provided with, e.g., two LED units 8 each including a 3-in-1 light-emitting diode. The 3-in-1 light-emitting diode includes light-emitting diodes 8r, 8g, 8b of RGB integrally so as to independently emit red light, green light and blue light from the light-emitting diodes 8r, 8g and 8b, respectively. Further, the respective illumination areas Ha are provided so as to correspond to the display areas Pa that are set on the display surface of the liquid crystal panel 2, whereby lights from the LED units 8 enter a plurality of pixels P included in the display areas Pa. For example, the display surface is provided with 1920×1080 pixels and one display area Pa includes 4050 (=1920×1080÷512 (=16×32)) pixels.

The light-emitting diodes 8r, 8g and 8b constitute light sources, and are configured to irradiate the corresponding display areas Pa with red light, green light and blue light, respectively.

In the above description, although the LED substrates 7 are used, placement of the LED substrates 7 can be omitted for example by arranging directly the LED units on the inner surface of the housing 4. Alternatively, it also is possible to change the number of the LED substrates 7 and LED units 8 to be placed respectively, or to set the illumination areas Ha and the display areas Pa at a ratio other than 1:1.

The number of the divided LED units 8 is not limited to 16×32 described above, and may be 10×20, for example.

Next, the configuration of main portions of the liquid crystal display device 1 of the present embodiment will be described specifically with reference to FIGS. 5-8.

Figure 5:
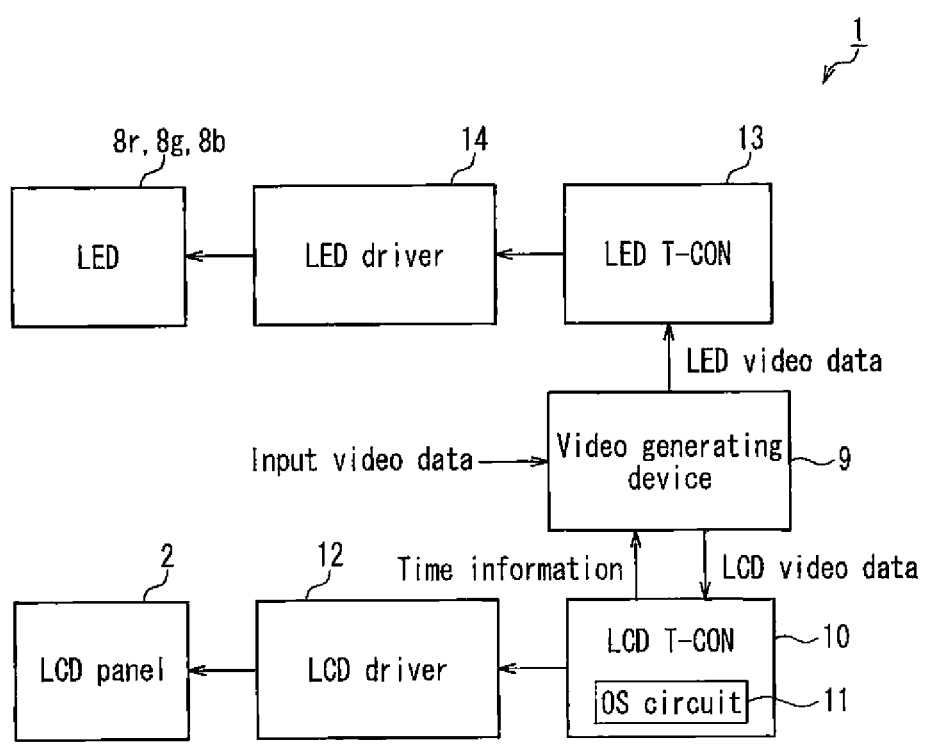
FIG. 5 a diagram illustrating a configuration of main portions of the liquid crystal display device shown in FIG. 1.
Figure 6:
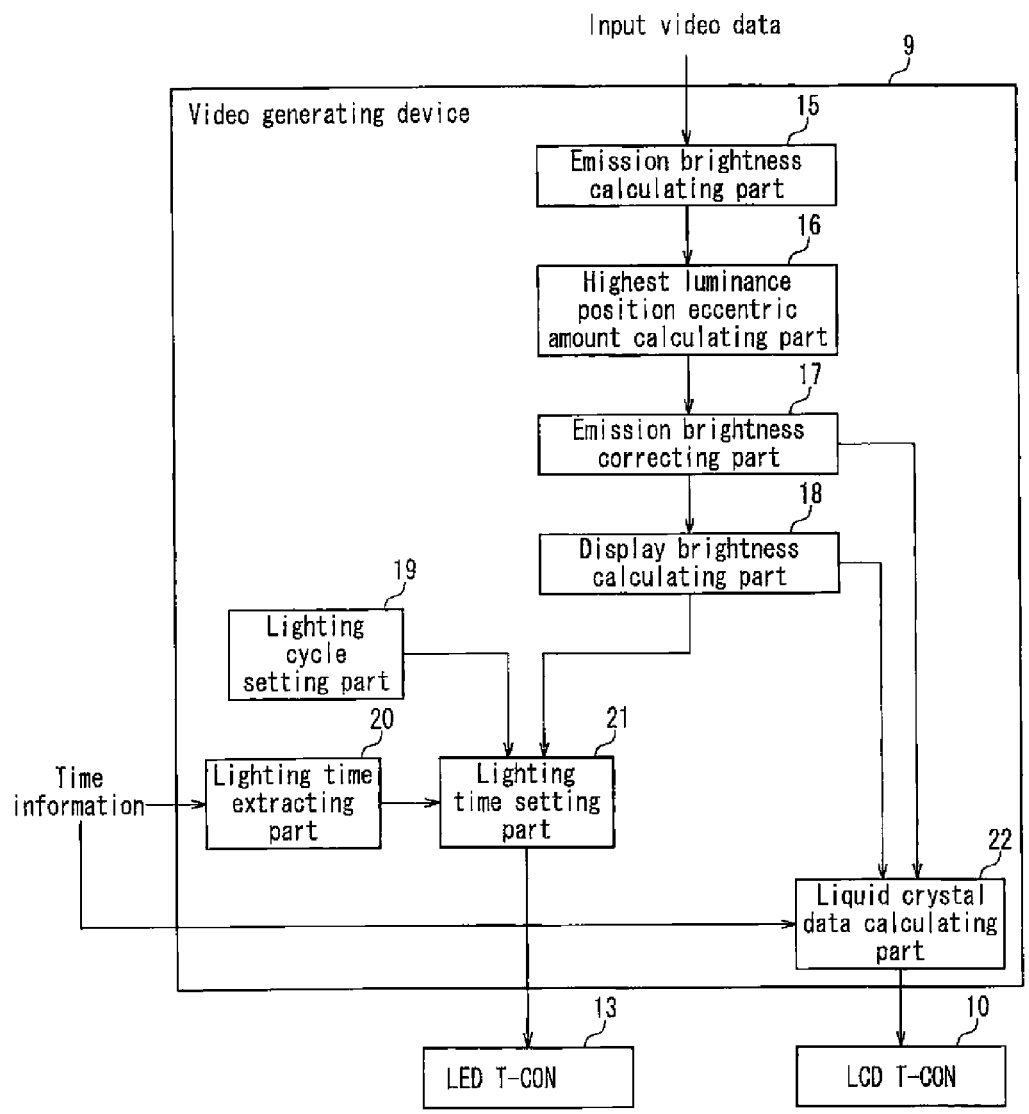
FIG. 6 is a block diagram showing a specific configuration of a video generating device shown in FIG. 5.
Figure 7:
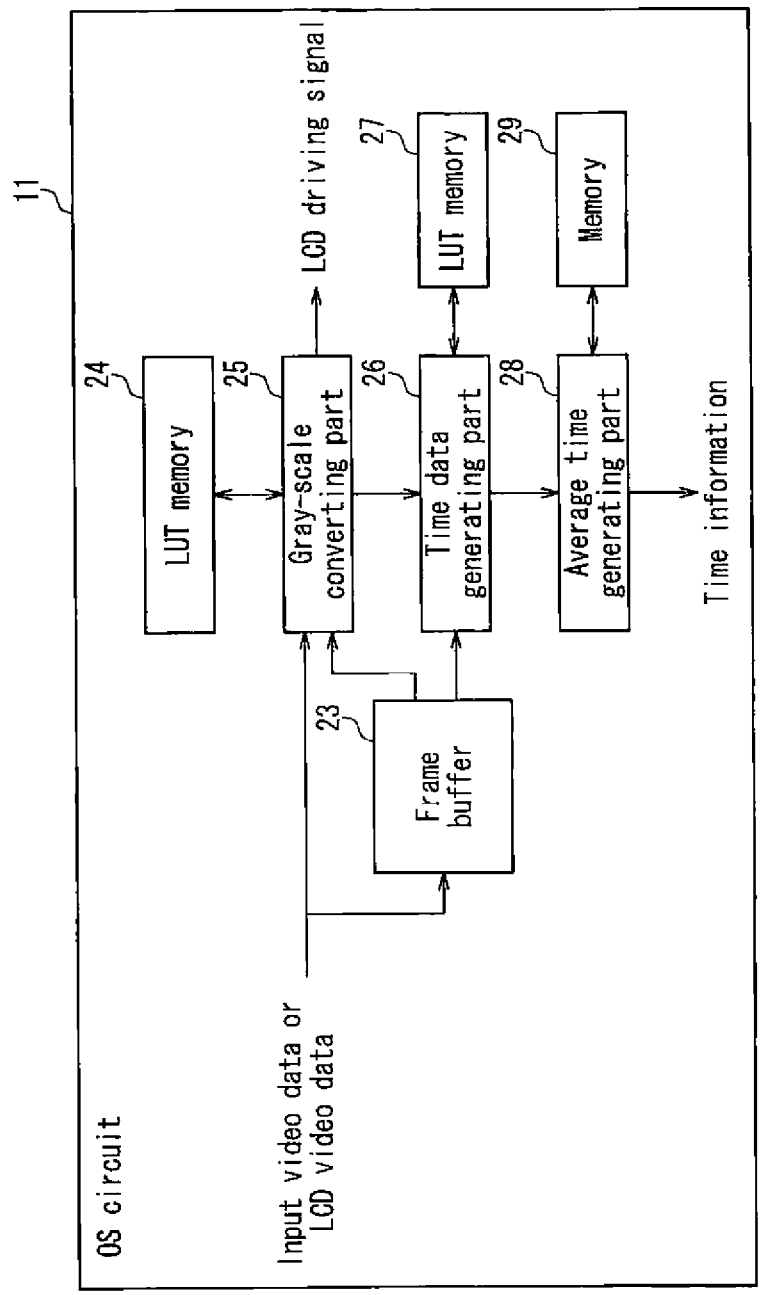
FIG. 7 is a block diagram showing a specific configuration of an OS circuit shown in FIG. 5.
Figure 8:
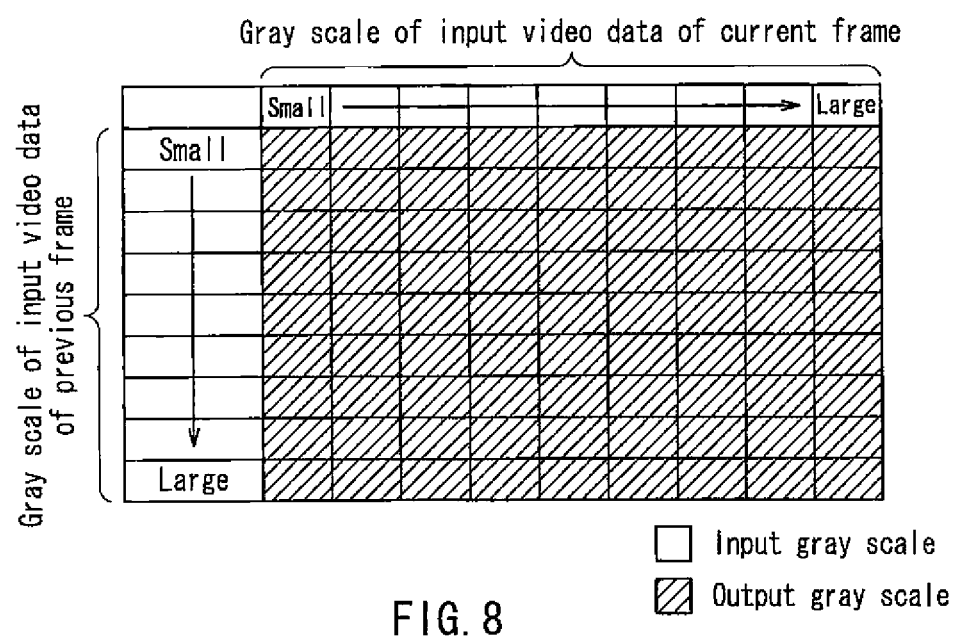
FIG. 8 is a diagram illustrating a specific example of a memory in an LUT memory shown in FIG. 7 that is used when a gray-scale converting part shown in FIG. 7 performs a gray-scale transition emphasis process.

FIG. 5 a diagram illustrating a configuration of main portions of the liquid crystal display device shown in FIG. 1. FIG. 6 is a block diagram showing a specific configuration of a video generating device shown in FIG. 5. FIG. 7 is a block diagram showing a specific configuration of an OS circuit shown in FIG. 5. FIG. 8 is a diagram illustrating a specific example of a memory in an LUT memory shown in FIG. 7 that is used when a gray-scale converting part shown in FIG. 7 performs a gray-scale transition emphasis process.

As shown in FIG. 5, the liquid crystal display device 1 of the present embodiment includes the above-described video generating device 9 as a control part. An LCD T-CON (LCD timing control circuit) 10 provided with an OS (overshoot) circuit 11, an LCD driver 12 and the above-described liquid crystal panel (LCD panel) 2 are connected sequentially to the video generating device 9. The LCD driver 12 constitutes a display driving part that drives the liquid crystal panel (display part) 2 on a pixel basis. Further, these LCD T-CON 10, the LCD driver 12 and the liquid crystal panel 2 constitute an LCD module.

Moreover, an LED T-CON 13, an LED driver 14 and the above-described light-emitting diodes (LEDs) 8r, 8g, 8b are connected sequentially to the video generating device 9. The LED driver 14 constitutes a light source driving part that drives the light-emitting diodes (light sources) 8r, 8g, 8b. Further, these LED T-CON 13, the LED driver 14 and the light-emitting diodes 8r, 8g, 8b constitute a backlight device (backlight module) 3.

The video generating device 9 receives input video data from the outside of the liquid crystal display device 1. Further, the video generating device 9 receives time information from a time information generating part (described later) provided in the LCD T-CON 10, and generates LCD video data and LED video data using the inputted (input) video data and the time information, as described later. Then, the video generating device 9 outputs the LCD video data and the LED video data to the LCD T-CON 10 and the LED T-CON 13, respectively, thereby controlling the LCD driver (display driving part) 12 and the LED driver (light source driving part) 14.

Specifically, as shown in FIG. 6, the video generating device 9 includes an emission luminance calculating part 15, a highest luminance position eccentric amount calculating part 16, an emission luminance correcting part 17 and a display luminance calculating part 18. Further, the video generating device 9 is provided with a lighting cycle setting part 19, a lighting time extracting part 20, a lighting time setting part 21 and a liquid crystal data calculating part 22. The lighting time setting part 21 and the liquid crystal data calculating part 22 output LED video data and LCD video data to the LED T-CON 13 and the LCD T-CON 10, respectively. Further, these LCD video data and LED video data are obtained by reflecting time information from the time information generating part provided in the OS circuit 11 into input video data. Thereby, even in the case where a gray-scale transition occurs between two consecutive frames when the liquid crystal display device 1 displays a moving image, it is possible to minimize moving image blurring (detailed later).

Here, first, the specific configuration of the OS circuit 11 and the above-described time information will be described with reference to FIGS. 7 and 8.

As shown in FIG. 7, the OS circuit 11 includes a frame buffer 23, an LUT (look-up table) memory 24 and a gray-scale converting part 25. Further, the OS circuit 11 is equipped with a time data generating part 26, an LUT memory 27, an average time generating part 28 and a memory 29. The OS circuit 11 receives, from the video generating device 9, input video data or LCD video data obtained by reflecting time information into input video data. Further, the OS circuit 11 generates time information based on the input video data and outputs it to the video generating device 9, and also outputs the LCD video data reflecting time information to the LCD driver 12 as an LCD driving signal.

The frame buffer 23 receives one frame of input video data from the video generating device 9, and holds the one frame of input video data for one frame period (one vertical period).

The gray-scale converting part 25 receives one frame of input video data from the video generating device 9. Further, the gray-scale converting part 25 compares input video data of a current frame from the video generating device 9 with input video data of a previous frame (preceding by one frame to the current frame) that is held in the frame buffer 23. Based on the comparison result, the gray-scale converting part 25 determines whether information to be displayed on the liquid crystal panel 2 is a still image or a moving image. Specifically, when a gray scale of the current frame and a gray scale of the previous frame are the same in each of all the pixels contained in the liquid crystal panel 2, the gray-scale converting part 25 judges that a still image will be displayed on the liquid crystal panel 2. Meanwhile, when the gray scale of the current frame and the gray scale of the previous frame are different in one or more of all the pixels contained in the liquid crystal panel 2, the gray-scale converting part 25 judges that a moving image will be displayed on the liquid crystal panel 2.

Further, when the gray-scale converting part 25 judges that a moving image will be displayed on the liquid crystal panel 2, it refers to the LUT memory 24 to perform a predetermined gray-scale transition emphasis process (overshoot drive). In other words, when the gray-scale transition occurs between two consecutive frames, the gray-scale converting part 25 performs a predetermined gray-scale transition emphasis process with respect to video data of the frame in which the gray-scale transition occurs (input video data of the current frame), and outputs video data after the gray-scale transition emphasis process to the time data generating part 26 contained in the above-described time information generating part.

For allowing the gray-scale converting part 25 to perform a predetermined gray-scale transition emphasis process, as illustrated by a shaded area in FIG. 8 for example, the LUT memory 24 previously holds a correction gray-scale value to be output to a combination of the gray scale of input video data of the previous frame and the gray scale of input video data of the current frame. The gray-scale converting part 25 reads out the correction gray-scale value that corresponds to the combination of the gray scale of input video data of the previous frame and the gray scale of input video data of the current frame from the LUT memory 24 on the pixel basis, incorporates the value into the video data after the gray-scale transition emphasis process, and outputs it to the time data generating part 26.

In this manner, by performing the gray-scale transition emphasis process (overshoot drive) at the gray-scale converting part 25, a response speed of a liquid crystal contained in the liquid crystal panel 2 is improved, and thus the moving image blurring can be suppressed reliably.

Specifically, in two consecutive frames, when the gray-scale transition occurs from a gray scale a to a gray scale b that is higher than the gray scale a for example, a voltage of a gray scale b' (correction gray scale) that is higher than a voltage for achieving the gray scale b is applied to the pixel for a predetermined period. Then, a voltage in accordance with the target gray scale b is applied. Consequently, in the liquid crystal panel 2, the orientation change of liquid crystal molecules is promoted and the response speed of the liquid crystal is improved accordingly. Thereby, in the present embodiment, the moving image blurring can be suppressed reliably.

Further, when the gray-scale transition occurs from the gray scale a to a gray scale c that is lower than the gray scale a, a voltage of a gray scale c' (correction gray scale) that is lower than a voltage for achieving the gray scale c is applied to the pixel for a predetermined period. Thus, the same effect can be obtained.

In addition to the above description, the LUT memory 24 may hold plural kinds of the above-described correction gray-scale values (look-up table) in accordance with the temperature condition at the liquid crystal panel 2, for example. With such a configuration, even when the temperature condition at the liquid crystal panel 2 changes, it is possible to perform an appropriate overshoot drive capable of improving the response speed of the liquid crystal reliably.

Further, when the gray-scale converting part 25 receives LCD video data reflecting time information from the video generating device 9, it outputs the inputted LCD video data to the LCD driver 12 as an LCD driving signal. In this manner, for suppressing the moving image blurring, feedback of the video data is controlled between the video generating device 9 and the LCD T-CON 10 (OS circuit 11).

The time data generating part 26 receives input video data of the previous frame (preceding by one frame to the current frame) that is held in the frame buffer 23. Further, the time data generating part 26 receives video data after the gray-scale transition emphasis process from the gray-scale converting part 25. Moreover, the time data generating part 26 refers to the LUT memory 27, and obtains, when the gray-scale transition occurs between two consecutive frames, gray-scale transition times (response time) required for the gray-scale transition on the pixel basis.

The LUT memory 27 holds gray-scale transition time (response time) that is predetermined in association with the gray scale of input video data of the previous frame and the correction gray scale of input video data of the current frame calculated at the gray-scale converting part 25. Further, the LUT memory 27 stores plural kinds of gray-scale transition times in accordance with the temperature condition at the liquid crystal panel 2. The time data generating part 26 obtains temperature data at the liquid crystal panel 2 from a temperature sensor (not shown). Further, the time data generating part 26 reads out, from the LUT memory 27, gray-scale transition times in accordance with the temperature condition at the liquid crystal panel 2 on the pixel basis, using the obtained temperature data, the gray scale of input video data of the previous frame from the frame buffer 23 and the correction gray scale of input video data of the current frame from the gray-scale converting part 25, and outputs them to the average time generating part 28.

In addition to the above description, for example, in the case where a liquid crystal with a high response speed is used in the liquid crystal panel 2, and the liquid crystal display device is configured without the gray-scale converting part 25 and the LUT memory 24, the time data generating part 26 receives input video data of the current frame from the video generating device 9 and input video data of the previous frame (preceding by one frame to the current frame) that is held in the frame buffer 23, obtains gray-scale transition times corresponding to the gray-scale transition in these input video data from the LUT memory 27 on the pixel basis, and outputs them to the average time generating part 28, which are similar to the gray-scale converting part 25. In the pixel in which the gray-scale transition does not occur, the gray-scale transition time is "0".

The average time generating part 28 receives gray-scale transition times on the pixel basis from the time data generating part 26. Then, the average time generating part 28 causes the memory 29 to store the inputted gray-scale transition times in association with the respective display areas Pa. Further, the average time generating part 28 reads out the gray-scale transition times of the pixels on a display area Pa basis from the memory 29, calculates the average time, and outputs it to the video generating device 9 as time information.

Further, in the liquid crystal display device 1 of the present embodiment, the above-described time information generating part is configured so that, when the gray-scale transition occurs between two consecutive frames, the time data generating part 26 and the average time generating part 28 calculate an average time taken to respond to the gray-scale transition in a plurality of pixels, and generate it as time information.

Returning to FIG. 6, in the video generating device 9, the emission luminance calculating part 15 receives input video data from the outside. Based on the input video data inputted, the emission luminance calculating part 15 calculates a luminance signal of the corresponding LED unit 8 on the illumination area Ha basis. This luminance signal is a signal indicating emission luminance per the illumination area Ha (LED unit 8). Further, in the luminance signal, luminance values of the light-emitting diodes (light sources) 8*r*, 8*g*, 8*b* contained in the corresponding LED unit 8 are instructed. Then, the emission luminance calculating part 15 outputs the calculated luminance signal to the highest luminance position eccentric amount calculating part 16.

Based on the luminance signal per the illumination area Ha from the emission luminance calculating part 15, the highest luminance position eccentric amount calculating part 16 calculates positions at which luminance values of the respective colors of RGB become highest in each of the illumination areas Ha. Further, based on the calculated position data, the highest luminance position eccentric amount calculating part 16 obtains data on eccentric amounts of the highest luminance positions that indicates the degree of the displacement of the highest luminance positions from the center position of the corresponding illumination area Ha Then, the highest luminance position eccentric amount calculating part 16 outputs, to the emission luminance correcting part 17, the obtained eccentric amount data of the highest luminance positions and the luminance signal per illumination area Ha from the emission luminance calculating part 15.

Based on the eccentric amount data of the highest luminance positions from the highest luminance position eccentric amount calculating part 16 and the luminance signal, the emission luminance correcting part 17 corrects, per the illumination area Ha, the respective luminance values of RGB in the vicinity of the highest luminance positions that are included in the luminance signal. Then, the emission luminance correcting part 17 outputs a luminance signal after correction (respective luminance values of RGB) to the display luminance calculating part 18 and the liquid crystal data calculating part 22.

With respect to the luminance signal from the emission luminance correcting part 17, the display luminance calculating part 18 obtains luminance distribution data from a memory (not shown). Then, by using the luminance values of the respective light-emitting diodes 8r, 8g, 8b included in the luminance signal and the obtained luminance distribution data, the display luminance calculating part 18 superimposes the luminance of each of all the light-emitting diodes 8r, 8g, 8b and calculates a luminance distribution in the backlight device 3 that corresponds to display precision (the number of pixels) of the liquid crystal panel 2. In other words, in the luminance distribution, a luminance signal is included that includes luminance values of the display luminance to be actually displayed in the respective light-emitting diodes 8r, 8g, 8b corresponding to all the pixels. Then, the display luminance calculating part 18 outputs the calculated luminance distribution (luminance signal) to the lighting time setting part 21 and the liquid crystal data calculating part 22.

The luminance distribution data is a value obtained by measuring or calculating the spread of light from the respective light-emitting diodes (light sources) 8r, 8g, 8b that is visually recognized through the liquid crystal panel 2 including the optical sheet group 5, etc., and the data is stored previously in the above-described memory. By using the luminance distribution data, information can be displayed on the liquid crystal panel (display part) 2 with more suitable luminance, and thus the display quality can be improved.

The lighting cycle setting part 19 sets a lighting cycle of the backlight device 3 so that the light-emitting diodes 8r, 8g, 8b (light sources) are turned into a non-lighting state (OFF period) and a lighting state (ON period) in a first half and a latter half of one frame cycle, respectively, and outputs, to the lighting time setting part 21, a cycle instruction signal that instructs the set lighting cycle. By the lighting cycle setting part 19, all the light-emitting diodes 8r, 8g, 8b are set to be switched on in accordance with the frame cycle of input video data (input (video) signal), and, regardless of the specification of the LED driver 14, in lighting instruction signals of the respective light-emitting diodes 8r, 8g, 8b included in the LED video data to be output to the LED T-CON 13, the OFF period and the ON period of the respective light-emitting diodes 8r, 8g, 8b are set in the first half and the latter half of the frame, respectively.

The lighting time extracting part 20 receives time information from the average time generating part 28 of the OS circuit 11. Then, the lighting time extracting part 20 extracts gray-scale transition time included in the inputted time information, and outputs it to the lighting time setting part 21.

The lighting time setting part 21 receives the luminance distribution (luminance signal) from the display luminance calculating part 18, the cycle instruction signal from the lighting cycle setting part 19 and the gray-scale transition time from the lighting time extracting part 20. Then, based on the inputted luminance signal, the cycle instruction signal and the gray-scale transition time, the lighting time setting part 21 generates a luminance signal that reflects the gray-scale transition time for minimizing visual recognition of the gray-scale transition (i.e., for minimizing recognition of the moving image blurring) in the ON period in the latter half of the frame. In other words, the lighting time setting part 21 generates lighting instruction signals with respect to all the light-emitting diodes 8r, 8g, 8b and outputs LED video data containing these lighting instruction signals to the LED T-CON 13.

In other words, the video generating device (control part) 9 decides, in the frame in which the gray-scale transition occurs, at least a length of either the OFF period of the light-emitting diodes 8r, 8g, 8b (light sources) in the first half of the frame or the ON period of the light-emitting diodes 8r, 8g, 8b (light sources) in the latter half of the frame, based on the time information from the time information generating part. Further, the video generating device 9 outputs an instruction signal to the LED driver (light source driving part) 14 for driving the light-emitting diodes 8r, 8g, 8b (light sources) in accordance with the decided OFF or ON period.

Further, the lighting time setting part 21 sets the above-described LED video data so that the length of the OFF period in the first half of the frame is longer as the length of the inputted gray-scale transition time is longer. In other words, the video generating device (control part) 9 decides the length of the OFF period to be longer as the average time included in the time information from the time information generating part is longer.

Moreover, when values of the inputted gray-scale transition time are "0" in all the pixels, i.e., the gray-scale transition does not occur between two consecutive frames, the lighting time setting part 21 sets the above-described LED video data so that the length of the OFF period takes a fixed value in the frame in which the gray-scale transition does not occur. In other words, when the video generating device (control part) 9 determines that the gray-scale transition does not occur between two consecutive frames, it decides the length of the OFF period to be a fixed value in the frame in which the gray-scale transition does not occur.

The liquid crystal data calculating part 22 receives the luminance signal after correction from the emission luminance correcting part 17, the luminance distribution from the display luminance calculating part 18, and the time information from the average time generating part 28 of the OS circuit 11. Then, the liquid crystal data calculating part 22 obtains gray-scale transition time in each pixel from the inputted time information, and calculates a transmittance of each pixel based on the obtained gray-scale transition time, the luminance distribution and the luminance signal. Thereafter, the liquid crystal data calculating part 22 incorporates the calculated transmittance of each pixel into the LCD video data, and outputs it to the LCD T-CON 10. Thereby, the LCD video data obtained by reflecting time information into input video data is fed back to the OS circuit 11, and given to the LCD driver 12 as the LCD driving signal from the gray-scale converting part 25, as described above.

Hereinafter, operations in the liquid crystal display device 1 of the present embodiment configured as above will be described specifically also with reference to FIG. 9.

Figure 9:
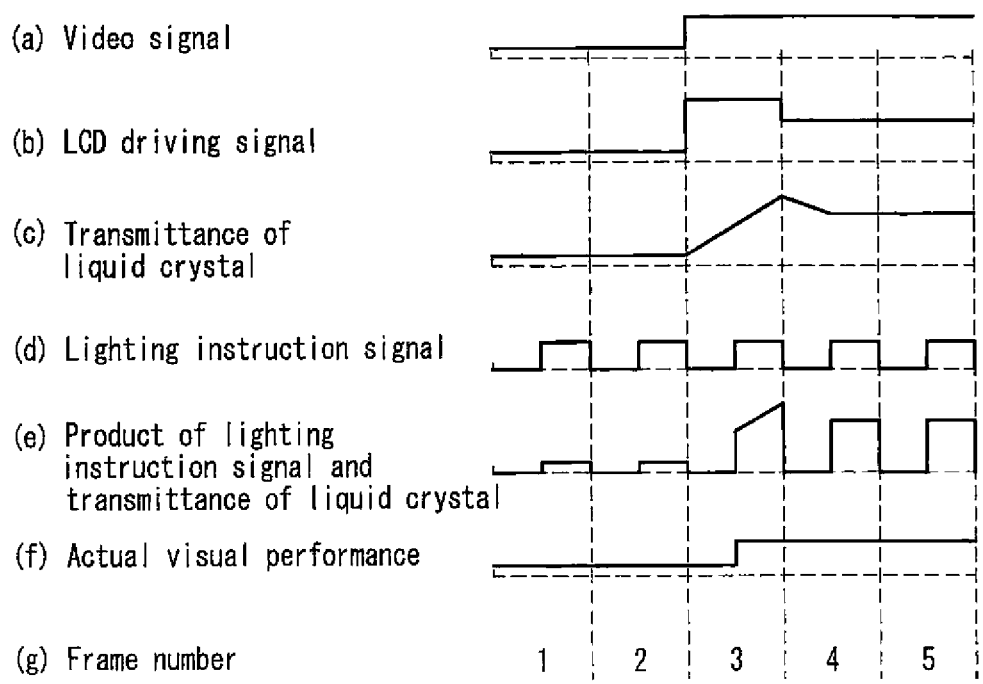
FIG. 9 is a timing chart showing a relationship among signals of respective parts, a transmittance of a liquid crystal, a lighting instruction signal, and a product of the lighting instruction signal and the transmittance of the liquid crystal when images are displayed in the liquid crystal display device shown in FIG. 1.

FIG. 9 is a timing chart showing a relationship among signals of respective parts, a transmittance of a liquid crystal, a lighting instruction signal, and a product of the lighting instruction signal and the transmittance of the liquid crystal when images are displayed in the liquid crystal display device shown in FIG. 1.

As exemplarily shown in FIG. 9(a), when the video generating device 9 receives a video signal (input video data) in which the gray-scale transition occurs in a frame number 3 (FIG. 9(g)), a LCD driving signal subjected to the gray-scale transition emphasis process is generated in the OS circuit 11 as shown in FIG. 9(b). In other words, as shown in FIG. 9(b), a LCD driving signal whose gray scale is emphasized in the frame number 3 is generated.

Further, by using the video data after the gray-scale transition emphasis process inputted from the gray-scale converting part 25, the time data generating part 26 obtains, from the LUT memory 27, gray-scale transition times in accordance with the gray-scale transition in the frame number 3 on the display areas Pa basis, and outputs them to the average time generating part 28. Then, the average time generating part 28 causes the memory 29 to store the gray-scale transition times from the time data generating part 26 in association with the respective display areas Pa. Further, the average time generating part 28 reads out, from the memory 29, the gray-scale transition times of the pixels on the display area Pa basis for calculating the average time. Thereby, in the liquid crystal panel 2, in the corresponding display area Pa, the transmittance of the pixels changes as shown in FIG. 9(c). In other words, as shown in FIG. 9(c), the transmittance of the pixels increases rapidly as compared with the case of not performing the gray-scale transition emphasis process, which results in a mountain-shaped peak.

Further, in the video generating device 9, the lighting time setting part 21 receives the luminance distribution (luminance signal) from the display luminance calculating part 18, the cycle instruction signal from the lighting cycle setting part 19 and the gray-scale transition time from the lighting time extracting part 20. Then, based on the inputted luminance signal, the cycle instruction signal and the gray-scale transition time, the lighting time setting part 21 generates lighting instruction signals with respect to the light-emitting diodes 8r, 8g, 8b contained in the corresponding illumination area Ha. As shown in FIG. 9(d), in these lighting instruction signals, the OFF period and the ON period are set in the first half and the latter half of the frame, respectively.

Further, as shown in FIG. 9(e), in the frame number 3, the product of the lighting instruction signal and the transmittance of the liquid crystal (i.e., luminance in the pixel) increases significantly as compared with the case of not performing the gray-scale transition emphasis process. Therefore, as shown in FIG. 9(f), a user can see an abrupt rising edge of the gray-scale transition. In other words, the user can visually recognize a moving image display with a sharply-outlined image.

In the liquid crystal display device of the present embodiment configured as above, when the gray-scale transition occurs between two consecutive frames, the time data generating part (time information generating part) 26 and the average time generating part (time information generating part) 28 calculate an average time taken to respond to the gray-scale transition in a plurality of pixels, and generate it as time information. Further, the video generating device (control part) 9 decides, in the frame in which the gray-scale transition occurs, at least a length of either the OFF period of the light-emitting diodes 8r, 8g, 8b (light sources) in the first half of the frame or the ON period of the light-emitting diodes 8r, 8g, 8b in the latter half of the frame based on the time information from the time information generating part. Further, the video generating device 9 outputs a lighting instruction signal (instruction signal) to the LED driver (light source driving part) 14 for driving the light-emitting diodes 8r, 8g, 8b in accordance with the decided OFF or ON period. Thus, in the liquid crystal display device 1 of the present embodiment, it is possible to drive the light-emitting diodes 8r, 8g, 8b properly while determining the degree of the gray-scale transition. Consequently, in the present embodiment, unlike the above-described conventional example, even if the degree of the gray-scale transition is large, it is possible to configure the liquid crystal display device 1 capable of suppressing the moving image blurring.

Further, the video generating device 9 of the present embodiment decides the length of the OFF period to be longer as the average time included in the time information from the time information generating part is longer. Thereby, in the present embodiment, it is possible to complete the gray-scale transition within the OFF period of the light-emitting diodes 8r, 8g, 8b in the first half of the frame in which the gray-scale transition occurs, whereby the moving image blurring can be suppressed reliably even when the degree of the gray-scale transition is large.

Further, when the video generating device 9 of the present embodiment determines that the gray-scale transition does not occur between two consecutive frames, it decides the length of the OFF period to be a fixed value in the frame in which the gray-scale transition does not occur. Thereby, processing operations at the video generating device 9 can be simplified, and a processing load of the video generating device 9 can be reduced accordingly.

In addition to the above description, constituent elements other than the control part (video generating device), i.e., the light source driving part, can be provided with a function of deciding, in a frame in which the gray-scale transition occurs, at least a length of either the OFF period of the light sources (light-emitting diodes) in the first half of the frame or the ON period of the light sources in the latter half of the frame based on the time information from the time information generating part, and outputting an instruction signal to the light source driving part (LED driver) for driving the light sources in accordance with the decided OFF or ON period. However, in the case of providing the above-described function in the light source driving part, it is necessary to change the specification of the light source driving part per backlight device.

Meanwhile, as in the present embodiment, by providing the above-described function in the control part, a general-purpose LED driver can be used as the light source driving part, whereby the cost of the liquid crystal display device can be suppressed significantly (the same applies to each of the following Embodiments 2-5).

[Embodiment 2]

Figure 10:
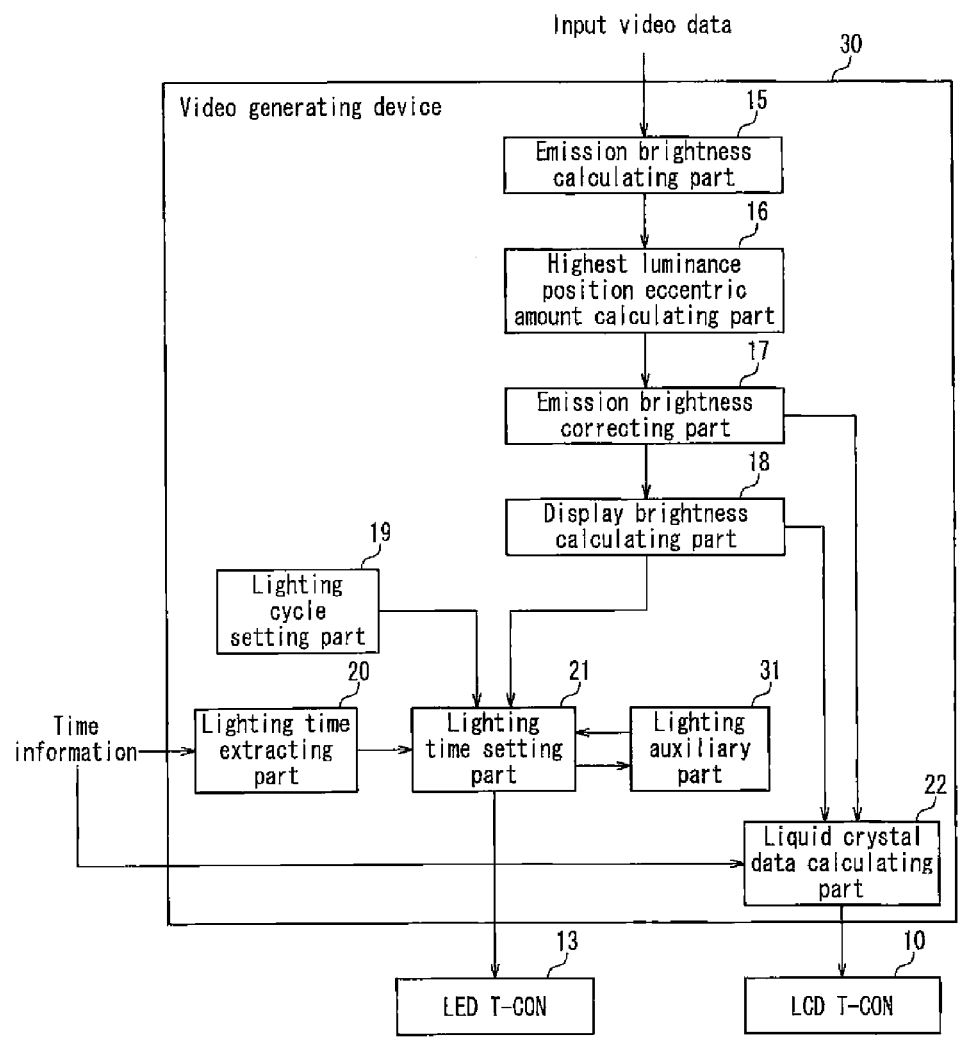
FIG. 10 is a block diagram showing a specific configuration of a video generating device in a liquid crystal display device according to Embodiment 2 of the present invention.

FIG. 10 is a block diagram showing a specific configuration of a video generating device in a liquid crystal display device according to Embodiment 2 of the present invention. In the drawing, the present embodiment mainly differs from the above-described Embodiment 1 in that the video generating device is provided with a lighting auxiliary part that corrects an instruction signal for increasing the luminance of light-emitting diodes based on the decided ON or OFF period. The common elements as those in the above-described Embodiment 1 are denoted with the same reference numerals, and the explanation will not be repeated.

As shown in FIG. 10, in a video generating device 30 of the present embodiment, a lighting auxiliary part 31 is connected to the lighting time setting part 21. The lighting auxiliary part 31 decides whether or not to increase the luminance of the respective light-emitting diodes 8r, 8g, 8b based on LED video data set at the lighting time setting part 21.

Specifically, based on the ON or OFF period set at the lighting time setting part 21, the lighting auxiliary part 31 determines whether or not the corresponding pixel will lack luminance. When the lighting auxiliary part 31 determines that the pixel will lack luminance, it corrects a lighting instruction signal (instruction signal) for increasing the luminance of the corresponding light-emitting diodes 8r, 8g, 8b.

Hereinafter, operations in the liquid crystal display device 1 of the present embodiment configured as above will be described specifically also with reference to FIG. 11.

Figure 11:
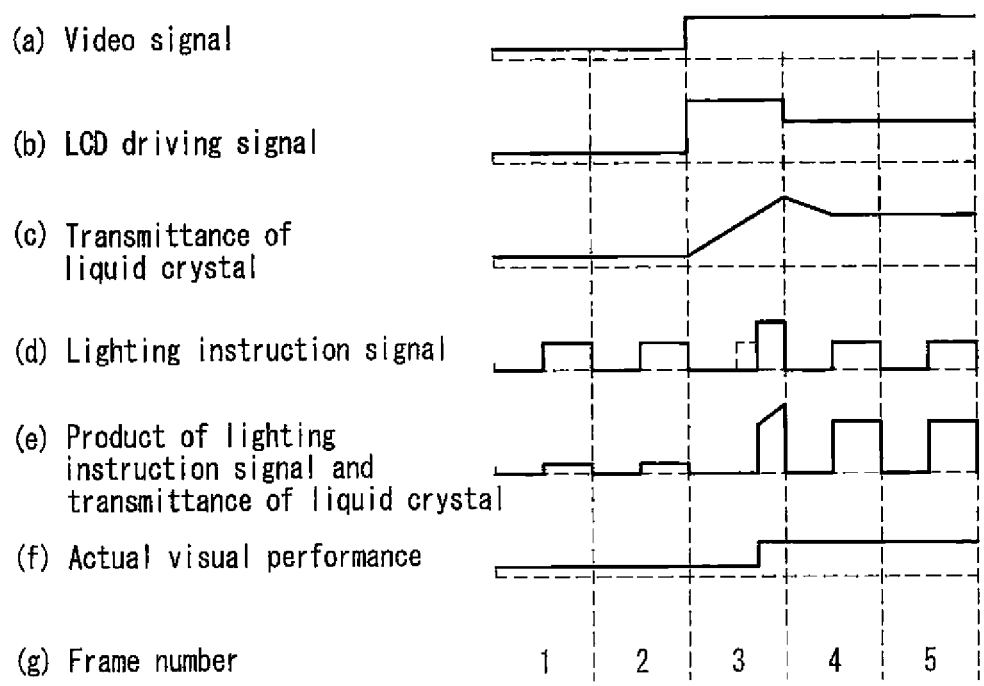
FIG. 11 is a timing chart showing a relationship among signals of respective parts, a transmittance of a liquid crystal, a lighting instruction signal, and a product of the lighting instruction signal and the transmittance of the liquid crystal when images are displayed in the liquid crystal display device according to Embodiment 2 of the present invention.

FIG. 11 is a timing chart showing a relationship among signals of respective parts, a transmittance of a liquid crystal, a lighting instruction signal, and a product of the lighting instruction signal and the transmittance of the liquid crystal when images are displayed in the liquid crystal display device according to Embodiment 2 of the present invention.

As exemplarily shown in FIG. 11(a), when the video generating device 30 receives a video signal (input video data) in which the gray-scale transition occurs in a frame number 3 (FIG. 11(g)), a LCD driving signal subjected to the gray-scale transition emphasis process is generated in the OS circuit 11 as shown in FIG. 11(b). In other words, as shown in FIG. 11(b), a LCD driving signal whose gray scale is emphasized in the frame number 3 is generated.

Further, by using the video data after the gray-scale transition emphasis process inputted from the gray-scale converting part 25, the time data generating part 26 obtains, from the LUT memory 27, gray-scale transition times in accordance with the gray-scale transition in the frame number 3 on the display areas Pa basis, and outputs them to the average time generating part 28. Then, the average time generating part 28 causes the memory 29 to store the gray-scale transition times from the time data generating part 26 in association with the respective display areas Pa. Further, the average time generating part 28 reads out, from the memory 29, the gray-scale transition times of the pixels on the display area Pa basis for calculating the average time. Thereby, in the liquid crystal panel 2, in the corresponding display area Pa, the transmittance of the pixels changes as shown in FIG. 11(c). In other words, as shown in FIG. 11(c), the transmittance of the pixels increases rapidly as compared with the case of not performing the gray-scale transition emphasis process, which results in a mountain-shaped peak.

Further, in the video generating device 30, the lighting time setting part 21 receives the luminance distribution (luminance signal) from the display luminance calculating part 18, the cycle instruction signal from the lighting cycle setting part 19 and the gray-scale transition time from the lighting time extracting part 20. Then, based on the inputted luminance signal, the cycle instruction signal and the gray-scale transition time, the lighting time setting part 21 generates lighting instruction signals with respect to the light-emitting diodes 8r, 8g, 8b contained in the corresponding illumination area Ha.

Further, in the video generating device 30 of the present embodiment, for example, based on the OFF period set at the lighting time setting part 21, the lighting auxiliary part 31 determines whether or not the corresponding pixel will lack luminance. When the lighting auxiliary part 31 determines that the pixel will lack luminance, it corrects a lighting instruction signal for increasing the luminance of the corresponding light-emitting diodes 8r, 8g, 8b. Thereby, as shown in FIG. 11 (d), the lighting instruction signal with respect to the light-emitting diodes 8r, 8g, 8b is set so that the OFF period in the first half of the frame is longer than the OFF period shown in FIG. 9(d) and the ON period in the latter half of the frame is shorter than the ON period shown in FIG. 9(d). Moreover, in the ON period, since the correction process by the lighting auxiliary part 31 increases an amplitude of the lighting instruction signal, a lack of luminance due to the lengthened OFF period (shortened ON period) can be avoided.

Hereinafter, the specific time of the above-described OFF period will be described further. Generally, when a difference in luminance between two consecutive frames having different gray scales is assumed to be 100%, the gray-scale transition time (the response speed of the liquid crystal) is time required for the luminance to change from 10% to 90% of the difference in luminance.

Here, when the frame frequency is 120 Hz, i.e., the liquid crystal panel 2 is driven at double speed, one frame cycle is about 8.3 ms. At this time, the OFF period is decided to be 90% of one frame cycle based on the assumption that the above-described gray-scale transition emphasis process is not performed, and as the worst condition, the response speed of the liquid crystal becomes 8.3 ms, which is equal to one frame cycle. In other words, in the frame in which the gray-scale transition occurs, the lighting time setting part 21 sets the OFF period to be 7.5 ms (=8.3 ms×0.9) in the first half of the frame, regardless of the size of the gray-scale transition time. Then, with respect to the OFF period set as above, in order to compensate the lack of luminance, the lighting auxiliary part 31 makes a correction to increase an amplitude of the lighting instruction signal with respect to the light-emitting diodes 8r, 8g, 8b. As described above, in the present embodiment, since the lighting time setting part 21 sets a constant OFF period (ON period), and the correction process by the lighting auxiliary part 31 resolves the lack of luminance, the process at the lighting time setting part 21 can be simplified, and thus easy ON/OFF control of the light-emitting diodes 8r, 8g, 8b can be realized. Incidentally, it is preferable to change the length of the OFF period depending on the response speed of the liquid crystal. Specifically, when the response speed of the liquid crystal is 4 ms for example, the OFF period may be 50% of one frame cycle.

Further, as shown in FIG. 11(e), in the frame number 3, the product of the lighting instruction signal and the transmittance of the liquid crystal (i.e., luminance in the pixel) increases significantly as compared with the case of not performing the gray-scale transition emphasis process. Therefore, as shown in FIG. 11W, a user can see an abrupt rising edge of the gray-scale transition. In other words, similarly to Embodiment 1, the user can visually recognize a moving image display with a sharply-outlined image.

With the above configuration, the present embodiment can provide the same function and effect as those of the above-described Embodiment 1. Further, the video generating device (control part) 30 of the present embodiment is provided with the lighting auxiliary part 31 that corrects a lighting instruction signal (instruction signal) for increasing the luminance of the light-emitting diodes 8r, 8g, 8b (light sources), based on the decided ON or OFF period. Thereby, the lack of luminance can be avoided in the respective pixels of the liquid crystal panel (display part) 2.

[Embodiment 3]

Figure 12:
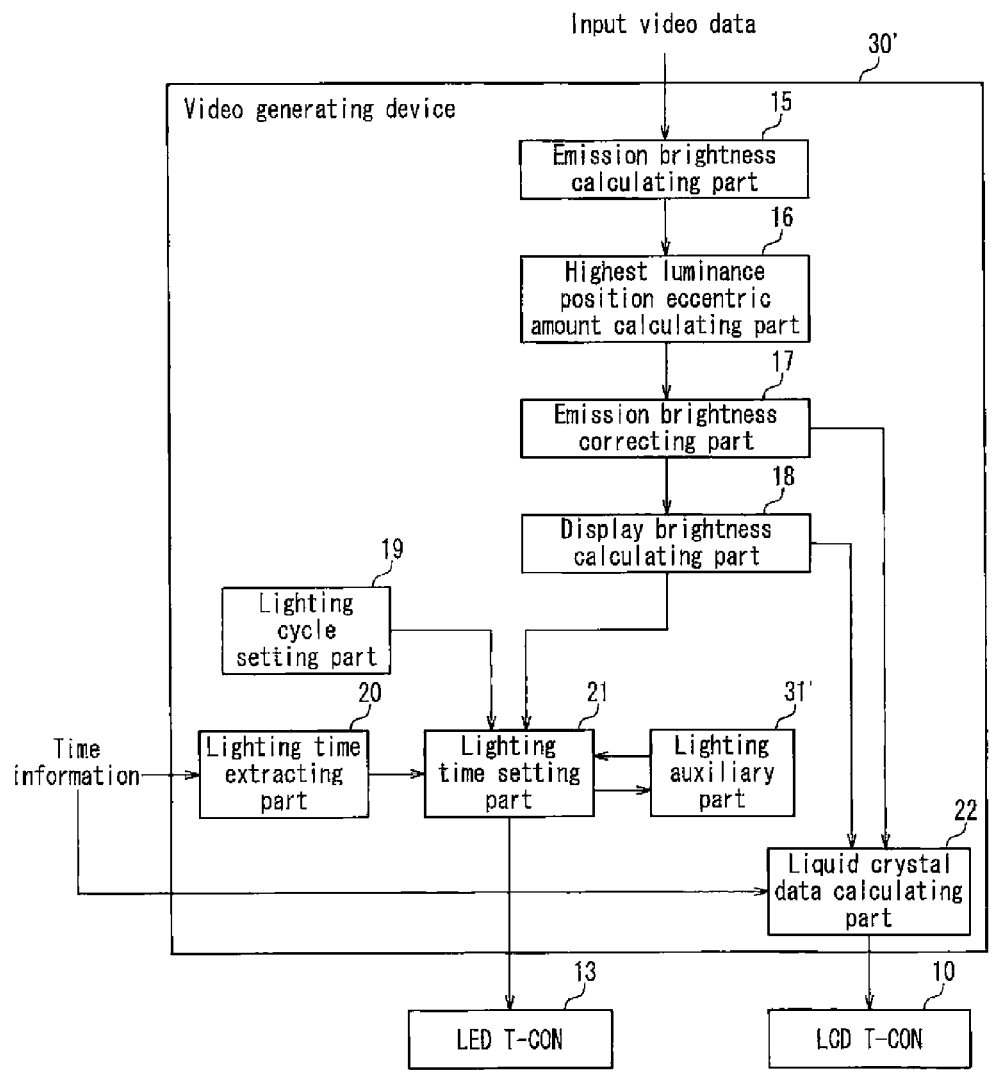
FIG. 12 is a block diagram showing a specific configuration of a video generating device in a liquid crystal display device according to Embodiment 3 of the present invention.

FIG. 12 is a block diagram showing a specific configuration of a video generating device in a liquid crystal display device according to Embodiment 3 of the present invention. In the drawing, the present embodiment mainly differs from the above-described Embodiment 2 in that the video generating device is provided with a lighting auxiliary part that corrects an instruction signal for increasing the luminance of light-emitting diodes on the illumination area basis, based on the decided ON or OFF period. The common elements as those in the above-described Embodiment 2 are denoted with the same reference numerals, and the explanation will not be repeated.

As shown in FIG. 12, in a video generating device 30' of the present embodiment, a lighting auxiliary part 31' is connected to the lighting time setting part 21. The lighting auxiliary part 31' decides whether or not to increase the luminance of the respective light-emitting diodes 8r, 8g, 8b on the illumination area Ha basis based on LED video data set at the lighting time setting part 21.

Specifically, based on the ON or OFF period set at the lighting time setting part 21, the lighting auxiliary part 31' determines whether or not the corresponding pixel will lack luminance. When the lighting auxiliary part 31' determines that the pixel will lack luminance, it corrects a lighting instruction signal (instruction signal) for increasing the luminance of the corresponding light-emitting diodes 8r, 8g, 8b on the illumination area Ha basis.

Hereinafter, operations in the liquid crystal display device 1 of the present embodiment configured as above will be described specifically also with reference to FIG. 13.

Figure 13:
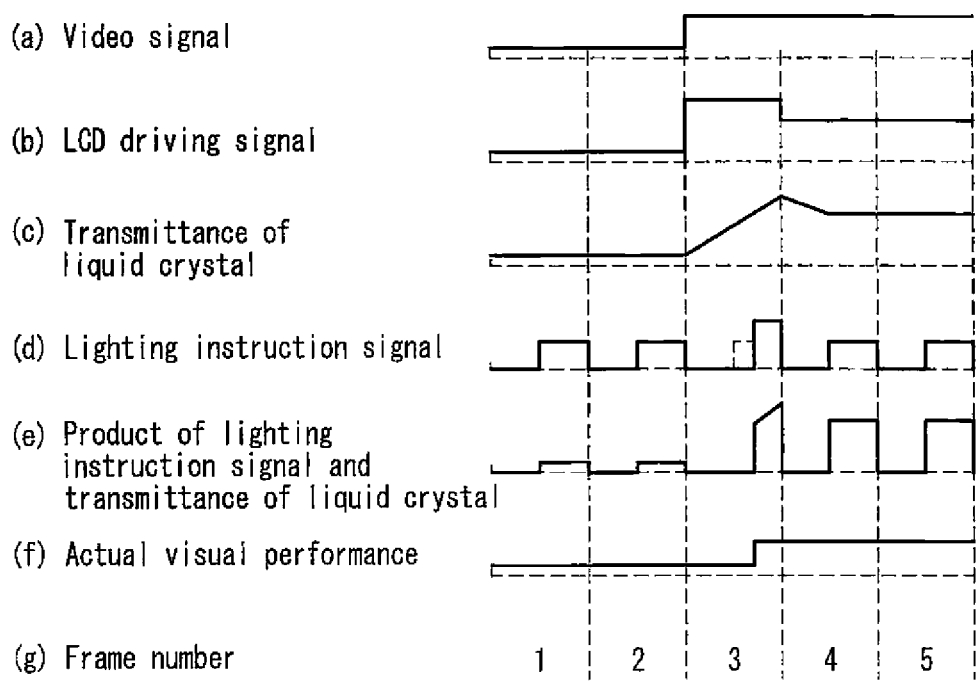
FIG. 13 is a timing chart showing a relationship among signals of respective parts, a transmittance of a liquid crystal, a lighting instruction signal, and a product of the lighting instruction signal and the transmittance of the liquid crystal when images are displayed in the liquid crystal display device according to Embodiment 3 of the present invention.

FIG. 13 is a timing chart showing a relationship among signals of respective parts, a transmittance of a liquid crystal, a lighting instruction signal, and a product of the lighting instruction signal and the transmittance of the liquid crystal when images are displayed in the liquid crystal display device according to Embodiment 3 of the present invention.

As exemplarily shown in FIG. 13(a), when the video generating device 30' receives a video signal (input video data) in which the gray-scale transition occurs in a frame number 3 (FIG. 13(g)), a LCD driving signal subjected to the gray-scale transition emphasis process is generated in the OS circuit 11 as shown in FIG. 13(b). In other words, as shown in FIG. 13(b), a LCD driving signal whose gray scale is emphasized in the frame number 3 is generated.

Further, by using the video data after the gray-scale transition emphasis process inputted from the gray-scale converting part 25, the time data generating part 26 obtains, from the LUT memory 27, gray-scale transition times in accordance with the gray-scale transition in the frame number 3 on the display areas Pa basis, and outputs them to the average time generating part 28. Then, the average time generating part 28 causes the memory 29 to store the gray-scale transition times from the time data generating part 26 in association with the respective display areas Pa. Further, the average time generating part 28 reads out, from the memory 29, the gray-scale transition times of the pixels on the display area Pa basis for calculating the average time. Thereby, in the liquid crystal panel 2, in the corresponding display area Pa, the transmittance of the pixels changes as shown in FIG. 13(c). In other words, as shown in FIG. 13(c), the transmittance of the pixels increases rapidly as compared with the case of not performing the gray-scale transition emphasis process, which results in a mountain-shaped peak.

Further, in the video generating device 30', the lighting time setting part 21 receives the luminance distribution (luminance signal) from the display luminance calculating part 18, the cycle instruction signal from the lighting cycle setting part 19 and the gray-scale transition time from the lighting time extracting part 20. Then, based on the inputted luminance signal, the cycle instruction signal and the gray-scale transition time, the lighting time setting part 21 generates lighting instruction signals with respect to the light-emitting diodes 8r, 8g, 8b contained in the corresponding illumination area Ha.

Further, in the video generating device 30' of the present embodiment, for example, based on the OFF period set at the lighting time setting part 21, the lighting auxiliary part 31' determines whether or not the corresponding pixel will lack luminance. When the lighting auxiliary part 31' determines that the pixel will lack luminance, it corrects a lighting instruction signal for increasing the luminance of the corresponding light-emitting diodes 8r, 8g, 8b on the illumination area Ha basis. Thereby, as shown in FIG. 13 (d), the lighting instruction signal with respect to the light-emitting diodes 8r, 8g, 8b is set so that the OFF period in the first half of the frame is longer than the OFF period shown in FIG. 9(d) and the ON period in the latter half of the frame is shorter than the ON period shown in FIG. 9(d). Moreover, in the ON period, since the correction process by the lighting auxiliary part 31' increases an amplitude of the lighting instruction signal, the lack of luminance due to the lengthened OFF period (shortened ON period) can be avoided. In other words, in the video generating device 30' of the present embodiment, similarly to the video generating device of Embodiment 2, since the lighting time setting part 21 sets the OFF period (ON period) to be constant, and the correction process by the lighting auxiliary part 31' resolves the lack of luminance, the process at the lighting time setting part 21 can be simplified, and thus easy ON/OFF control of the light-emitting diodes 8r, 8g, 8b can be realized.

Further, as shown in FIG. 13(e), in the frame number 3, the product of the lighting instruction signal and the transmittance of the liquid crystal (i.e., luminance in the pixel) increases significantly as compared with the case of not performing the gray-scale transition emphasis process. Therefore, as shown in FIG. 13(f), a user can see an abrupt rising edge of the gray-scale transition. In other words, similarly to Embodiment 1, the user can visually recognize a moving image display with a sharply-outlined image.

With the above configuration, the present embodiment can provide the same function and effect as those of the above-described Embodiment 1. Further, the video generating device (control part) 30' of the present embodiment is provided with the lighting auxiliary part 31' that corrects a lighting instruction signal (instruction signal) for increasing the luminance of the light-emitting diodes 8r, 8g, 8b (light sources) on the illumination area Ha basis, based on the decided ON or OFF period. Thereby, the lack of luminance can be avoided reliably in the respective pixels in the display areas Pa of the liquid crystal panel (display part) 2.

[Embodiment 4]

Figure 14:
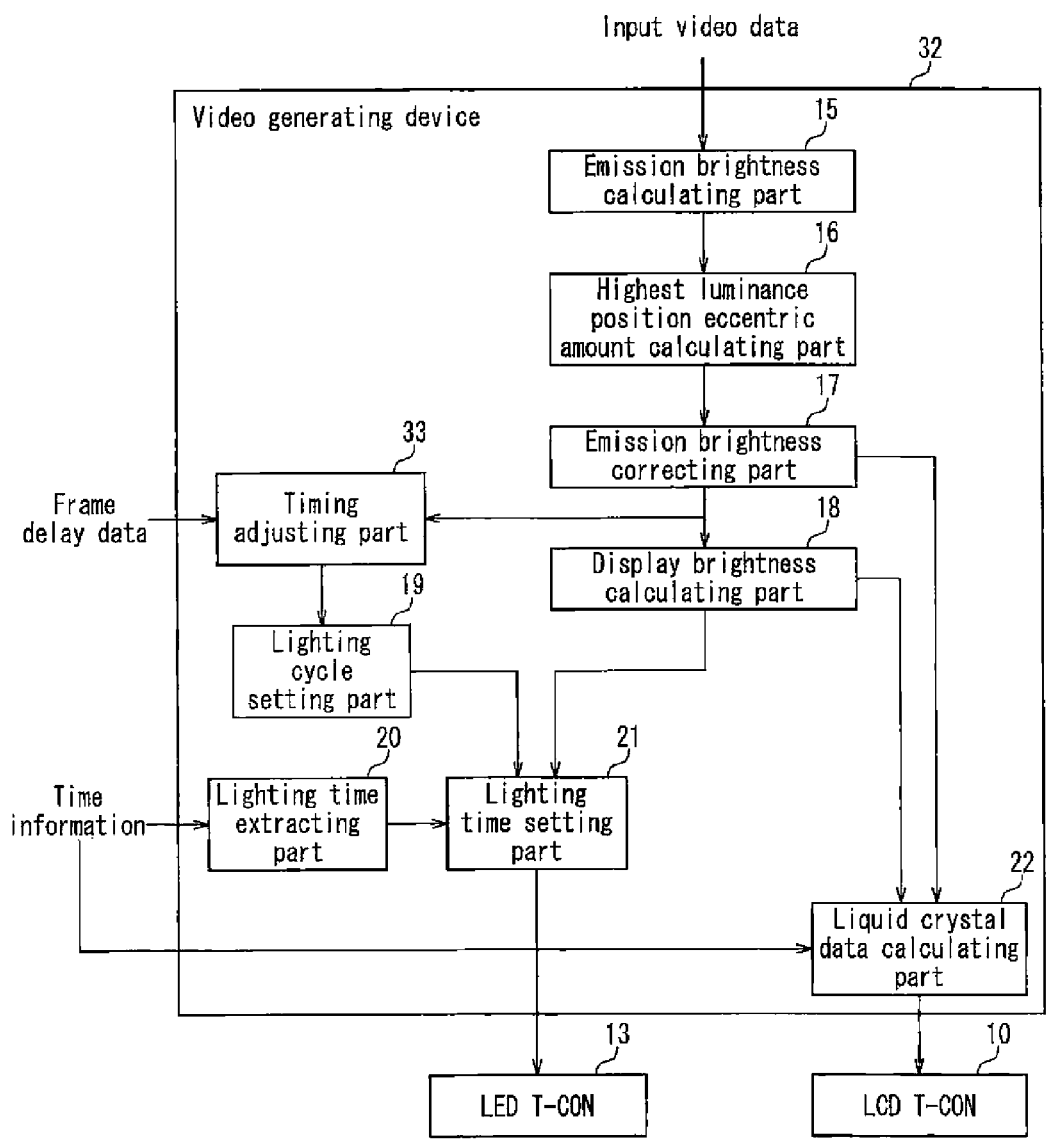
FIG. 14 is a block diagram showing a specific configuration of a video generating device in a liquid crystal display device according to Embodiment 4 of the present invention.

FIG. 14 is a block diagram showing a specific configuration of a video generating device in a liquid crystal display device according to Embodiment 4 of the present invention. In the drawing, the present embodiment mainly differs from the above-described Embodiment 1 in that the video generating device is provided with a timing adjusting part that adjusts output timing of an instruction signal with respect to the LED driver for delaying the drive of the light-emitting diodes in accordance with set frame delay data. The common elements as those in the above-described Embodiment 1 are denoted with the same reference numerals, and the explanation will not be repeated.

As shown in FIG. 14, in a video generating device 32 of the present embodiment, a timing adjusting part 33 is provided between the emission luminance correcting part 17 and the lighting cycle setting part 19. In the timing adjusting part 33, frame delay data is set that indicates a frame delay period caused by signal processings performed until the time when input video data (inputted video data) is supplied to the LCD driver (display driving part) 12. Then, in accordance with the set frame delay data, the timing adjusting part 33 adjusts output timing of a lighting instruction signal (instruction signal) with respect to the LED driver (light source driving part) 14 for delaying the drive of the light-emitting diodes 8r, 8g, 8b (light sources) on the frame basis.

Specifically, the timing adjusting part 33 generates a timing adjustment signal based on the set frame delay data and outputs it to the lighting cycle setting part 19. Based on the timing adjustment signal from the timing adjusting part 33, the lighting cycle setting part 19 generates a cycle instruction signal with respect to the lighting time setting part 21. Thereafter, the lighting time setting part 21 generates LED video data and outputs it to the LED T-CON 13. Thereby, the drive of the light-emitting diodes 8r, 8g, 8b is delayed on the frame basis in accordance with the set frame delay data.

Hereinafter, operations in the liquid crystal display device 1 of the present embodiment configured as above will be described specifically also with reference to FIG. 15.

Figure 15:
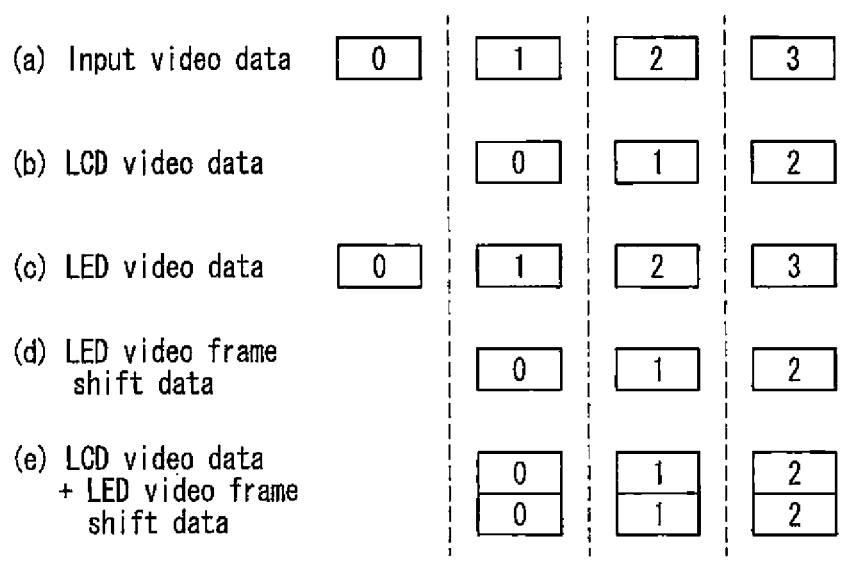
FIG. 15 is a timing chart showing a relationship among data of respective parts at the time of operating the liquid crystal display device according to Embodiment 4 of the present invention.

FIG. 15 is a timing chart showing a relationship among data of respective parts at the time of operating the liquid crystal display device according to Embodiment 4 of the present invention. In FIGS. 15(*a*)-15(*e*), numbers 0 to 3 refer to frame numbers.

As shown in FIG. 15, when the video generating device 32 receives input video data, the timing adjusting part 33 generates a timing adjustment signal based on the set frame delay data and outputs it to the lighting cycle setting part 19. Then, the lighting cycle setting part 19 generates a cycle instruction signal based on the timing adjustment signal from the timing adjusting part 33 and outputs it to the lighting time setting part 21. Thereby, the lighting time setting part 21 generates, as the LED video data, LED video frame shift data that is delayed by the number of frames in which LCD video data is delayed, and outputs it to the LED T-CON 13. Consequently, as shown in FIG. 15 (*e*), no frame delay is caused in the LCD video data and the LED video frame shift data, whereby images without variance can be displayed in the liquid crystal display device 1.

With the above configuration, the present embodiment can provide the same function and effect as those of the above-described Embodiment 1. Further, the video generating device (control part) 32 of the present embodiment is provided with the timing adjusting part 33 that adjusts the output timing of the lighting instruction signal (instruction signal) with respect to the LED driver (light source driving part) 14 for delaying the drive of the light-emitting diodes 8r, 8g, 8b (light sources) in accordance with the set frame delay data. Thereby, in the present embodiment, even when the frame delay period is caused, the liquid crystal panel (display part) 2 and the light-emitting diodes 8r, 8g, 8b can be driven properly, and the moving image blurring can be suppressed reliably.

[Embodiment 5]

Figure 16:
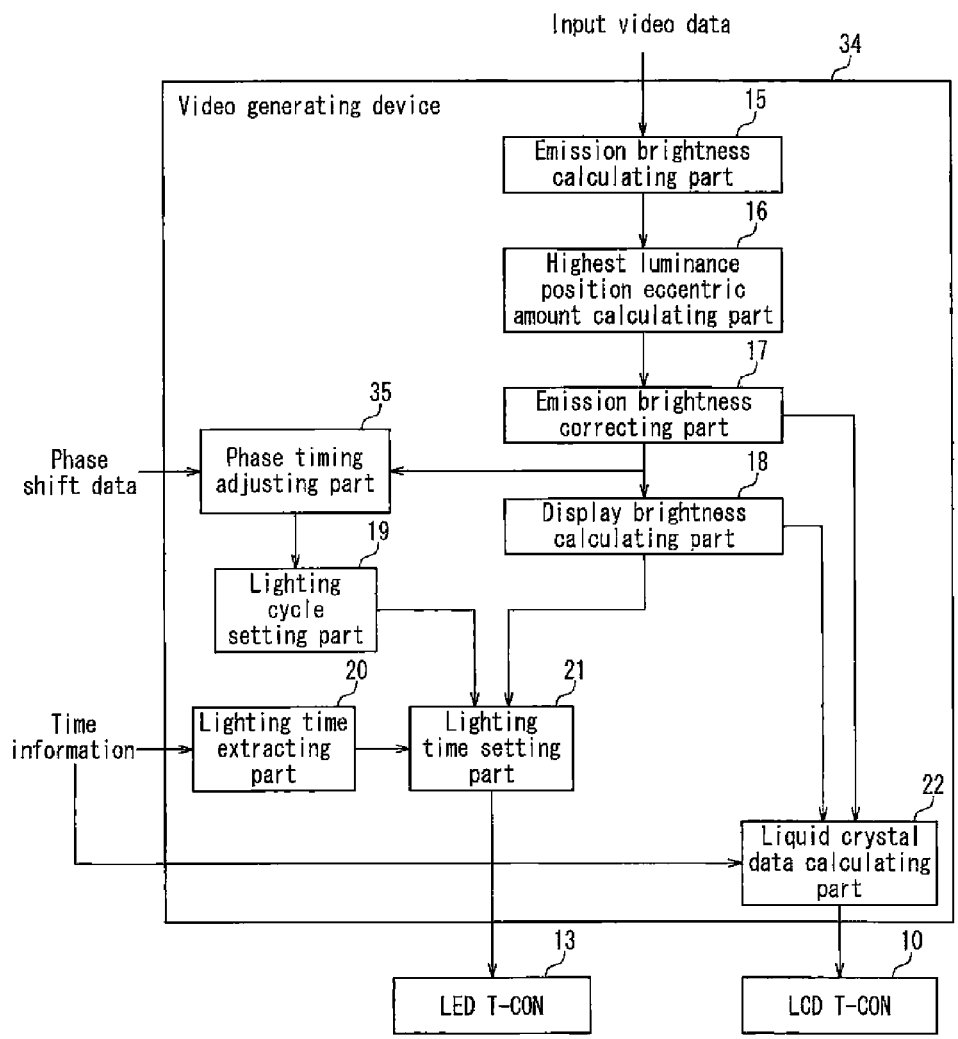
FIG. 16 is a block diagram showing a specific configuration of a video generating device in a liquid crystal display device according to Embodiment 5 of the present invention.

FIG. 16 is a block diagram showing a specific configuration of a video generating device in a liquid crystal display device according to Embodiment 5 of the present invention. In the drawing, the present embodiment mainly differs from the above-described Embodiment 1 in that the video generating device is provided with a phase timing adjusting part that adjusts output timing of an instruction signal with respect to the LED driver for delaying the drive of the light-emitting diodes in accordance with set phase shift data. The common elements as those in the above-described Embodiment 1 are denoted with the same reference numerals, and the explanation will not be repeated.

As shown in FIG. 16, in a video generating device 34 of the present embodiment, a phase timing adjusting part 35 is provided between the emission luminance correcting part 17 and the lighting cycle setting part 19. In the phase timing adjusting part 35, phase shift data is set that indicates a phase shift less than one frame period caused by signal processings performed until the time when input video data (inputted video data) is supplied to the LCD driver (display driving part) 12. Then, in accordance with the set phase shift data, the phase timing adjusting part 35 adjusts output timing of a lighting instruction signal (instruction signal) with respect to the LED driver (light source driving part) 14 for delaying the drive of the light-emitting diodes 8r, 8g, 8b (light sources).

Specifically, the phase timing adjusting part 35 generates a phase timing adjustment signal based on the set phase shift data and outputs it to the lighting cycle setting part 19. Based on the phase timing adjustment signal from the phase timing adjusting part 35, the lighting cycle setting part 19 generates a cycle instruction signal with respect to the lighting time setting part 21. Thereafter, the lighting time setting part 21 generates LED video data and outputs it to the LED T-CON 13. Thereby, the drive of the light-emitting diodes 8r, 8g, 8b is delayed in accordance with the set phase shift data.

Hereinafter, operations in the liquid crystal display device 1 of the present embodiment configured as above will be described specifically also with reference to FIG. 17.

Figure 17:
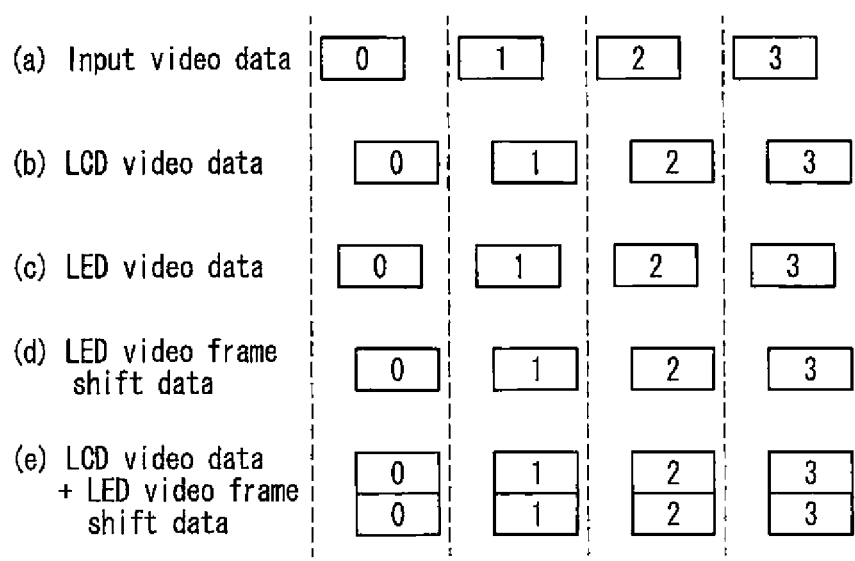
FIG. 17 is a timing chart showing a relationship among data of respective parts at the time of operating the liquid crystal display device according to Embodiment 5 of the present invention.

FIG. 17 is a timing chart showing a relationship among data of respective parts at the time of operating the liquid crystal display device according to Embodiment 5 of the present invention. In FIGS. 17(*a*)-17(*e*), numbers 0 to 3 refer to frame numbers.

As shown in FIG. 17, when the video generating device 34 receives input video data, the phase timing adjusting part 35 generates a phase timing adjustment signal based on the set phase shift data and outputs it to the lighting cycle setting part 19. Then, the lighting cycle setting part 19 generates a cycle instruction signal based on the phase timing adjustment signal from the phase timing adjusting part 35 and outputs it to the lighting time setting part 21. Thereby, the lighting time setting part 21 generates, as the LED video data, LED video frame shift data that is delayed by the phase shift in which LCD video data is delayed and outputs it to the LED T-CON 13. Consequently, as shown in FIG. 17 (*e*), no phase shift is caused in the LCD video data and the LED video frame shift data, whereby images without variance can be displayed in the liquid crystal display device 1.

With the above configuration, the present embodiment can provide the same function and effect as those of the above-described Embodiment 1. Further, the video generating device (control part) 34 of the present embodiment is provided with the phase timing adjusting part 35 that adjusts the output timing of the lighting instruction signal (instruction signal) with respect to the LED driver (light source driving part) 14 for delaying the drive of the light-emitting diodes 8r, 8g, 8b (light sources) in accordance with the set phase shift data. Thereby, in the present embodiment, even when the phase shift is caused, the liquid crystal panel (display part) 2 and the light-emitting diodes 8r, 8g, 8b can be driven properly, and the moving image blurring can be suppressed reliably.

The above embodiments are shown merely for an illustrative purpose and are not limiting. The technical range of the present invention is defined by the claims, and all the changes within a range equivalent to the configuration recited in the claims also are included in the technical range of the present invention.

For example, in the above description, the present invention is applied to a transmission-type liquid crystal display device. However, the display device of the present invention is not limited to this, and it can be applied also to various non-emission type display devices that display information by using light from a light source. Specifically, the display device of the present embodiment can be used suitably for a semi-transmission type liquid crystal display device or a projection-type display device such as a rear projection type that uses the liquid crystal panel for its light bulb.

Further, in the above description, the gray-scale converting part is provided that performs, when the gray-scale transition occurs between two consecutive frames, a predetermined gray-scale transition emphasis process with respect to video data of the frame in which the gray-scale transition occurs and that outputs video data after the gray-scale transition emphasis process to the time information generating part. Further, the time information generating part calculates an average time taken to respond to the gray-scale transition in a plurality of pixels using the video data from the gray-scale converting part, and generates it as time information. However, the present invention is not limited to this, and placement of the gray-scale converting part can be omitted when the above-described gray-scale transition emphasis process need not be performed by, for example, using a liquid crystal with a high response speed in the display part (liquid crystal panel).

However, as in the respective embodiments described above, it is preferable to provide the gray-scale converting part because the control part (video generating device) can drive light sources more properly while determining the degree of the gray-scale transition, whereby the moving image blurring can be suppressed reliably even if the degree of the gray-scale transition is large. Further, as compared with the case of not performing the gray-scale transition emphasis process, the control part can lengthen the ON period of the light sources, whereby a high-luminance display can be realized easily.

Further, in the above description, the so-called area active backlight drive is used in which a plurality of display areas are set in the display part (liquid crystal panel), a plurality of illumination areas are set in the backlight part (backlight device) for causing lights of light sources to respectively enter the plurality of display areas provided in the display part, and the light source driving part drives the light sources on the illumination area basis. However, the present invention is not limited to this, and for example, the entire display screen of the display part may be set as one display area.

However, as in the respective embodiments described above, it is preferable to use the area active backlight drive because an adverse effect of the gray-scale transition on the display can be reduced properly per display area, whereby the display quality is improved. Further, since the light sources are driven on the illumination area basis, it is possible to configure a display device with less power consumption easily.

Further, in the above description, 3-in-1 light-emitting diodes, each including light-emitting diodes of RGB integrally, are used as light sources. However, the light source of the present invention is not limited to this, and may be discharge tubes such as cold cathode fluorescent tubes and hot cathode fluorescent tubes, light-emitting elements such as organic and inorganic EL (Electronic Luminescence) elements, or light-emitting devices such as PDPs (Plasma Display Panel).

However, as in the respective embodiments described above, it is preferable to use light-emitting diodes as the light sources because it is possible to easily configure a display device with less power consumption and excellent environmental friendliness.

Further, the light-emitting diodes of the present invention are not limited to the above-described 3-in-1 light-emitting diodes, and may be individual R, G and B light-emitting diodes, white (W) light-emitting diodes emitting white light, or so-called 4-in-1 light-emitting diodes including four light-emitting diodes integrally such as R, G, B and W or G, R, G and B. Further, light-emitting diodes other than R, G, B and W may also be added. In this case, although it is necessary to add colors to the pixel configuration of the liquid crystal panel, a wider range of colors can be reproduced. Specific examples of the colors to be added include yellow and magenta.

However, as in the respective embodiments described above, it is preferable to use a plurality of types (e.g., RGB) of light-emitting diodes whose emission light colors are different from each other and that can be mixed into white light than to use only white light-emitting diodes in terms of improving the color purities of the corresponding emission light colors of the plurality of types of light-emitting diodes. Furthermore, an illumination device with excellent light-emitting quality and, by extension, a display device with excellent display quality can be achieved easily.

Further, in addition to the above description, a display device of the present invention may be configured by combining the respective Embodiment 1-5 properly.

The present invention is useful with respect to a display device capable of suppressing moving image blurring even if a degree of a gray-scale transition is large.

The invention claimed is:

1. A display device provided with a backlight part that has a light source, and a display part that includes a plurality of pixels and displays information using illumination light from the backlight part, the display device comprising:
   a light source driving part that drives the light source;
   a display driving part that drives the display part on a pixel basis;
   a time information generating part that calculates, when a gray-scale transition occurs between two consecutive frames, an average time taken to respond to the gray-scale transition in the plurality of pixels, and generates it as time information; and
   a control part that controls drive of the light source driving part and drive of the display driving part using inputted video data and the time information from the time information generating part,
   wherein the control part decides, in the frame in which the gray-scale transition occurs, at least a length of either an OFF period of the light source in a first half of the frame or an ON period of the light source in a latter half of the frame, based on the time information from the time infolination generating part, and outputs an instruction signal to the light source driving part in accordance with the decided OFF or ON period for driving the light source.

2. The display device according to claim 1, further comprising a gray-scale converting part that performs, when a gray-scale transition occurs between two consecutive frames, a predetermined gray-scale transition emphasis process with respect to video data of the frame in which the gray-scale transition occurs, and outputs video data after the gray-scale transition emphasis process to the time information generating part,
   wherein the time information generating part calculates an average time taken to respond to the gray-scale transition in the plurality of pixels using the video data from the gray-scale converting part, and generates it as time information.

3. The display device according to claim 1, wherein the control part decides the length of the OFF period to be longer as the average time included in the time information from the time information generating part is longer.

4. The display device according to claim 1, wherein, when the control part determines that a gray-scale transition does not occur between two consecutive frames, it decides the length of the OFF period to be a fixed value in the frame in which the gray-scale transition does not occur.

5. The display device according to claim 1, wherein the control part is provided with a lighting auxiliary part that corrects the instruction signal for increasing luminance of the light source based on the decided ON or OFF period.

6. The display device according to claim 1, wherein the control part is provided with a timing adjusting part in which frame delay data is set that indicates a frame delay period caused by signal processing performed until the time when inputted video data is supplied to the display driving part, and that adjusts, in accordance with the set frame delay data, output timing of the instruction signal with respect to the light source driving part for delaying drive of the light source on a frame basis.

7. The display device according to claim 1, wherein the control part is provided with a phase timing adjusting part in which phase shift data is set that indicates a phase shift less than one frame period caused by signal processing performed until the time when inputted video data is supplied to the display driving part, and that adjusts, in accordance with the set phase shift data, output timing of the instruction signal with respect to the light source driving part for delaying the drive of the light source.

8. The display device according to claim 1,
wherein a plurality of display areas are set in the display part,
a plurality of illumination areas are set in the backlight part for causing light of the light source to respectively enter the plurality of display areas provided in the display part, and
the light source driving part drives the light source on the illumination area basis.

9. The display device according to claim 8, wherein the control part is provided with a lighting auxiliary part that corrects the instruction signal for increasing luminance of the light source on the illumination area basis based on the decided ON or OFF period.

10. The display device according to claim 1, wherein the display part is a liquid crystal panel.

11. The display device according to claim 1, wherein the light source is a light-emitting diode.

12. The display device according to claim 1, wherein the light source is a plurality of types of light-emitting diodes whose emission light colors are different from each other and that can be mixed into white light.

\* \* \* \* \*